(12) United States Patent
Ou et al.

(10) Patent No.: US 12,105,559 B2
(45) Date of Patent: Oct. 1, 2024

(54) 2-AXIS SOFT HINGE MECHANISM AND FOLDABLE DEVICE HAVING SAME

(71) Applicant: Google LLC, Mountain View, CA (US)

(72) Inventors: Davis Ou, New Taipei (TW); Mike Liu, New Taipei (TW); Vincent Chien, New Taipei (TW); Ollie Chen, New Taipei (TW); Chun Tseng, New Taipei (TW)

(73) Assignee: Google LLC, Mountain View, CA (US)

( * ) Notice: Subject to any disclaimer, the term of this patent is extended or adjusted under 35 U.S.C. 154(b) by 265 days.

(21) Appl. No.: 17/310,843

(22) PCT Filed: Aug. 27, 2020

(86) PCT No.: PCT/US2020/070466
§ 371 (c)(1),
(2) Date: Aug. 26, 2021

(87) PCT Pub. No.: WO2021/051124
PCT Pub. Date: Mar. 18, 2021

(65) Prior Publication Data
US 2022/0091635 A1    Mar. 24, 2022

Related U.S. Application Data

(60) Provisional application No. 62/899,485, filed on Sep. 12, 2019.

(51) Int. Cl.
G06F 1/16     (2006.01)
H04M 1/02     (2006.01)

(52) U.S. Cl.
CPC .......... *G06F 1/1652* (2013.01); *G06F 1/1681* (2013.01); *H04M 1/0268* (2013.01)

(58) Field of Classification Search
CPC .... G06F 1/1652; G06F 1/1681; G06F 1/1616; H04M 1/0268; H04M 1/0237; H04M 1/022; F16M 11/10
See application file for complete search history.

(56) References Cited

U.S. PATENT DOCUMENTS 9,541,962 B2   1/2017   Siddiqui
9,874,048 B1   1/2018   Hsu
(Continued)

FOREIGN PATENT DOCUMENTS

CN     109488681 A    3/2019
EP       3699728 A1   8/2020
(Continued)

OTHER PUBLICATIONS

First Office Action and Search Report, and translation thereof, from counterpart Chinese Application No. 202080042544.8 dated Sep. 1, 2023, 18 pp.
(Continued)

*Primary Examiner* — Anthony M Haughton
*Assistant Examiner* — Theron S Milliser
(74) *Attorney, Agent, or Firm* — Shumaker & Sieffert, P.A.

(57) ABSTRACT

A foldable device may include a foldable layer and a hinge mechanism. The hinge mechanism may include a hinge cover fixedly coupled to a hinge base. A plurality of rotation pivots may be rotatably coupled to the hinge base and the hinge cover. A housing of a computing device may be coupled to the rotation pivots, such that, as the rotation pivots rotate into the hinge base and hinge cover, the computing device is unfolded, and as the rotation pivots rotate out of the hinge base and hinge cover, the computing device is folded. Rotation of the rotation pivots into and out of the hinge base and hinge cover may be restricted by one
(Continued)

or more stopping mechanisms, so as to maintain a foldable display of the computing device within allowable bending limits.

11 Claims, 20 Drawing Sheets

(56) References Cited

U.S. PATENT DOCUMENTS

| | | | |
|---|---|---|---|
| 10,036,188 B1 | 7/2018 | Yao et al. | |
| 10,664,021 B1 | 5/2020 | Hsu et al. | |
| 10,845,850 B1* | 11/2020 | Kang | E05D 3/122 |
| 11,169,578 B2* | 11/2021 | Hsu | H05K 5/0226 |
| 11,231,754 B2* | 1/2022 | Kang | H04M 1/022 |
| 11,243,578 B2* | 2/2022 | Torres | G06F 1/1616 |
| 11,294,431 B2* | 4/2022 | Torres | G06F 1/1681 |
| 11,353,931 B2* | 6/2022 | Hsu | G06F 1/1681 |
| 11,435,785 B2* | 9/2022 | Song | G06F 1/1652 |
| 11,470,735 B2* | 10/2022 | Kim | E05D 11/02 |
| 11,537,173 B2* | 12/2022 | Kim | G06F 1/1641 |
| 11,543,854 B2* | 1/2023 | Park | G06F 1/1681 |
| 11,561,588 B2* | 1/2023 | Hsu | G06F 1/169 |
| 11,614,780 B2* | 3/2023 | Kim | H04M 1/0216 361/679.01 |
| 11,619,978 B2* | 4/2023 | Jan | G06F 1/1681 361/679.27 |
| 11,625,073 B2* | 4/2023 | Shim | G06F 1/1681 361/679.28 |
| 11,656,659 B2* | 5/2023 | Choi | G06F 1/1681 361/679.27 |
| 11,662,781 B2* | 5/2023 | Kang | G06F 1/1616 361/679.01 |
| 11,726,530 B2* | 8/2023 | Kang | H04M 1/022 361/679.27 |
| 11,762,433 B2* | 9/2023 | Kim | H04M 1/0216 361/679.01 |
| 11,809,239 B2* | 11/2023 | Hwang | G06F 1/1616 |
| 2016/0205792 A1 | 7/2016 | Ahn | |
| 2018/0024593 A1 | 1/2018 | Seo | |
| 2018/0335679 A1 | 11/2018 | Hashimoto et al. | |
| 2019/0268456 A1 | 8/2019 | Park et al. | |
| 2020/0264673 A1* | 8/2020 | Kim | G06F 1/1681 |
| 2020/0348732 A1* | 11/2020 | Kang | G06F 1/1652 |
| 2020/0383219 A1 | 12/2020 | Hale et al. | |
| 2020/0409427 A1* | 12/2020 | Hsu | E05D 11/082 |
| 2021/0026407 A1* | 1/2021 | Park | H04M 1/0268 |
| 2021/0034116 A1* | 2/2021 | Torres | G06F 1/1616 |
| 2021/0034117 A1* | 2/2021 | Torres | G06F 1/1616 |
| 2021/0041921 A1* | 2/2021 | Kang | G06F 1/1652 |
| 2021/0048844 A1* | 2/2021 | Hsu | H04M 1/0216 |
| 2021/0048852 A1* | 2/2021 | Hsu | H05K 5/0226 |
| 2021/0081007 A1* | 3/2021 | Jan | G06F 1/1681 |
| 2021/0120687 A1* | 4/2021 | Kim | E05D 11/02 |
| 2021/0165466 A1* | 6/2021 | Kang | G06F 1/1681 |
| 2021/0247815 A1* | 8/2021 | Shim | G06F 1/1681 |
| 2021/0333838 A1* | 10/2021 | Song | G06F 1/1652 |
| 2021/0373612 A1* | 12/2021 | Hwang | H04M 1/0268 |
| 2021/0373614 A1* | 12/2021 | Kim | G06F 1/1616 |
| 2022/0035422 A1* | 2/2022 | Torres | G06F 1/1681 |
| 2022/0113770 A1* | 4/2022 | Kang | H04M 1/0268 |
| 2022/0147114 A1* | 5/2022 | Torres | G09F 9/301 |
| 2022/0155828 A1 | 5/2022 | Hsiang et al. | |
| 2022/0303371 A1 | 9/2022 | Liao et al. | |
| 2023/0021638 A1 | 1/2023 | Yun et al. | |
| 2023/0152849 A1* | 5/2023 | Park | G06F 1/1681 361/679.01 |
| 2023/0205281 A1* | 6/2023 | Kim | G06F 1/1652 361/679.01 |
| 2023/0205282 A1* | 6/2023 | Hwang | G06F 1/1681 361/679.27 |
| 2023/0229204 A1* | 7/2023 | Shim | G06F 1/1641 361/679.28 |
| 2023/0251692 A1* | 8/2023 | Kang | G06F 1/1681 361/679.01 |
| 2023/0359252 A1* | 11/2023 | Kang | H04M 1/022 |

FOREIGN PATENT DOCUMENTS

| | | |
|---|---|---|
| KR | 101861602 B1 | 5/2018 |
| KR | 1020190062107 A | 6/2019 |
| KR | 1020190097898 A | 8/2019 |
| WO | 2022035047 A1 | 2/2022 |
| WO | 2022093229 A1 | 5/2022 |
| WO | 2022199450 A1 | 9/2022 |

OTHER PUBLICATIONS

Office Action, and translation thereof, from counterpart Korean Application No. 20227001310 dated Mar. 29, 2023, 12 pp.
International Search Report and Written Opinion for International Application No. PCT/US2020/070466, mailed Dec. 4, 2020, 14 pages.
International Preliminary Report on Patentability from International Application No. PCT/US2020/070466 dated Mar. 15, 2022, 10 pp.
Notice of Intent to Grant from counterpart Korean Application No. 10-2022-7001310 dated Jun. 4, 2023, 4 pp.
Response to Office Action dated Mar. 29, 2023, from counterpart Korean Application No. 10-2022-7001310 filed May 26, 2023, 18 pp.
Holland et al., "Motorola's Razr folds in half without a crease. The secret is in the hinge design", CNET, retrieved from: https://www.cnet.com/tech/mobile/motorola-razr-folds-in-half-without-crease-secret-hinge-design/, Feb. 5, 2020, 9 pp.
Notice of Intent to Grant from counterpart Chinese Application No. 202080042544.8 dated Feb. 8, 2024, 4 pp.
Notice of Intent to Grant and Text Intended to Grant from counterpart European Application No. 20768487.9 dated Jul. 2, 2024, 9 pp.

* cited by examiner

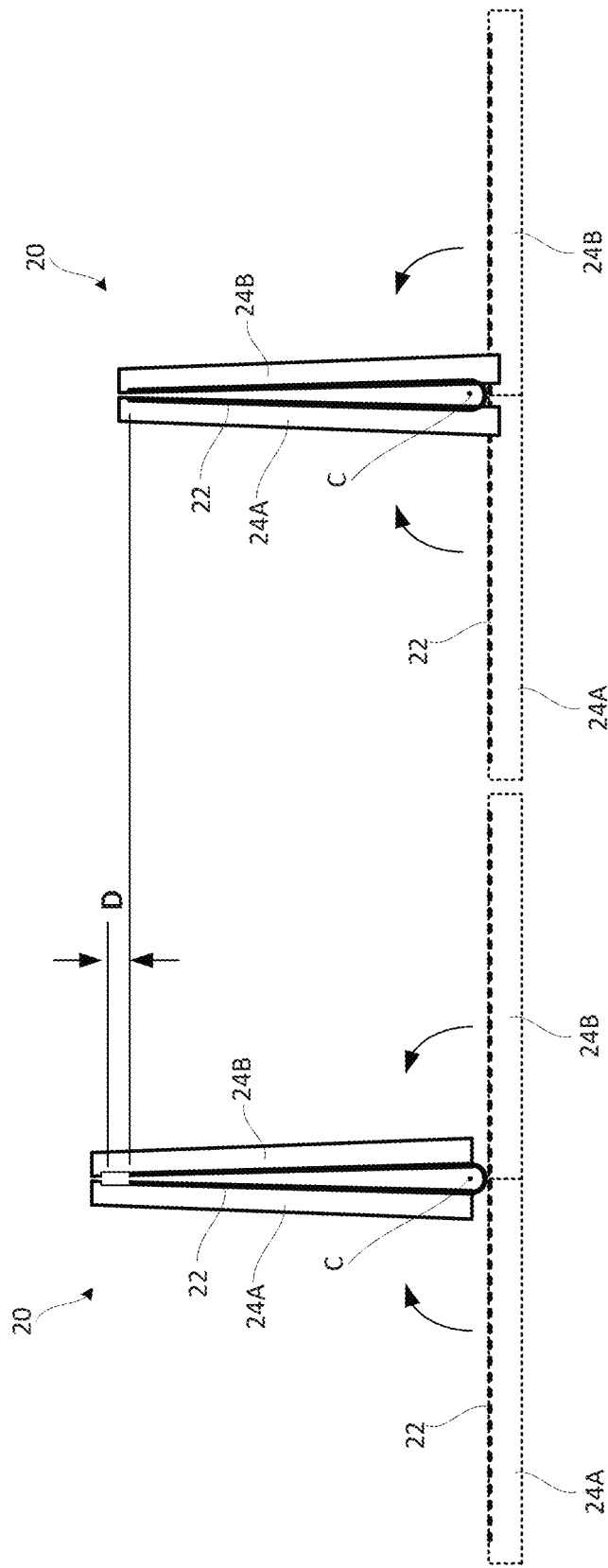

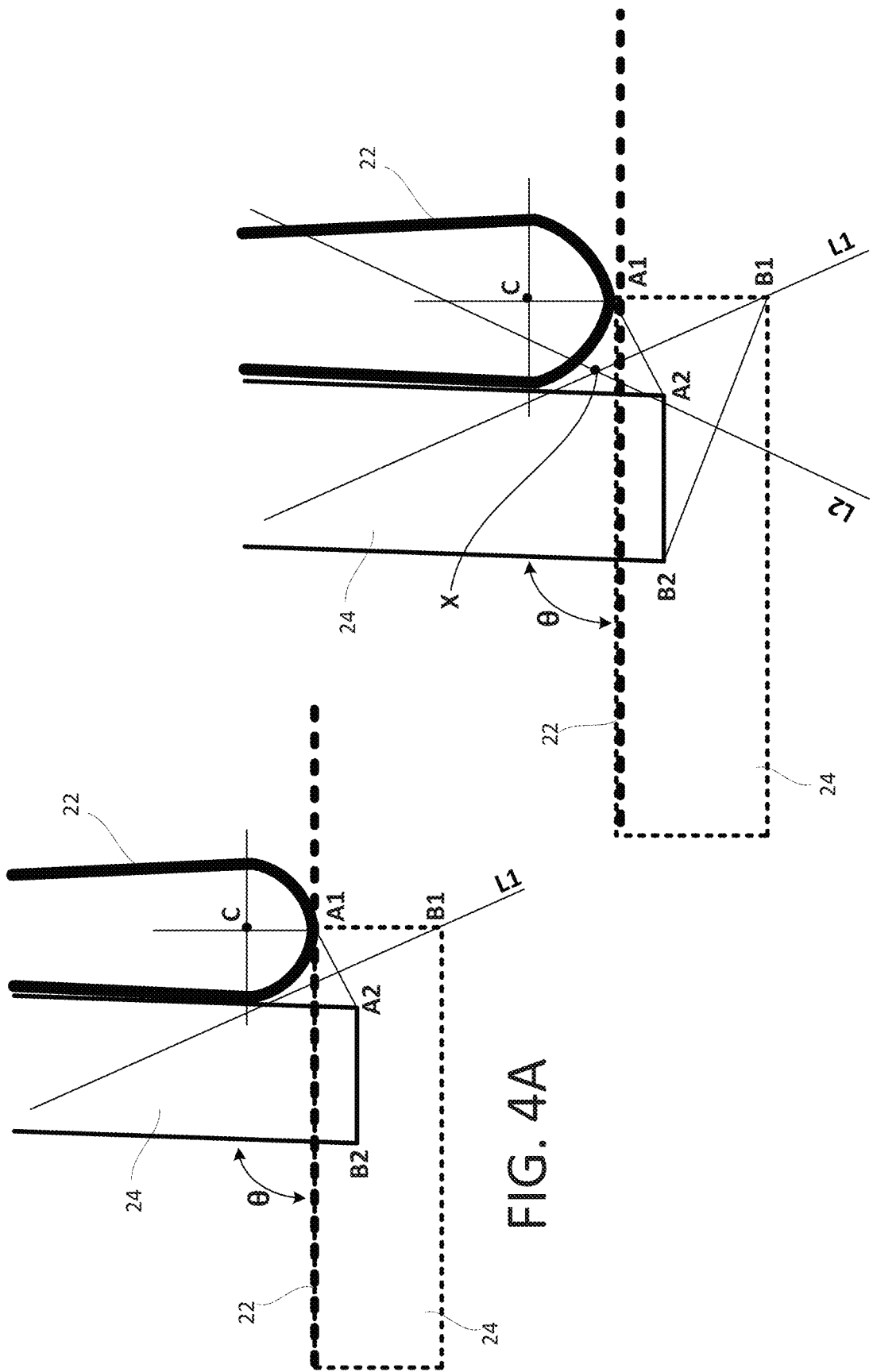

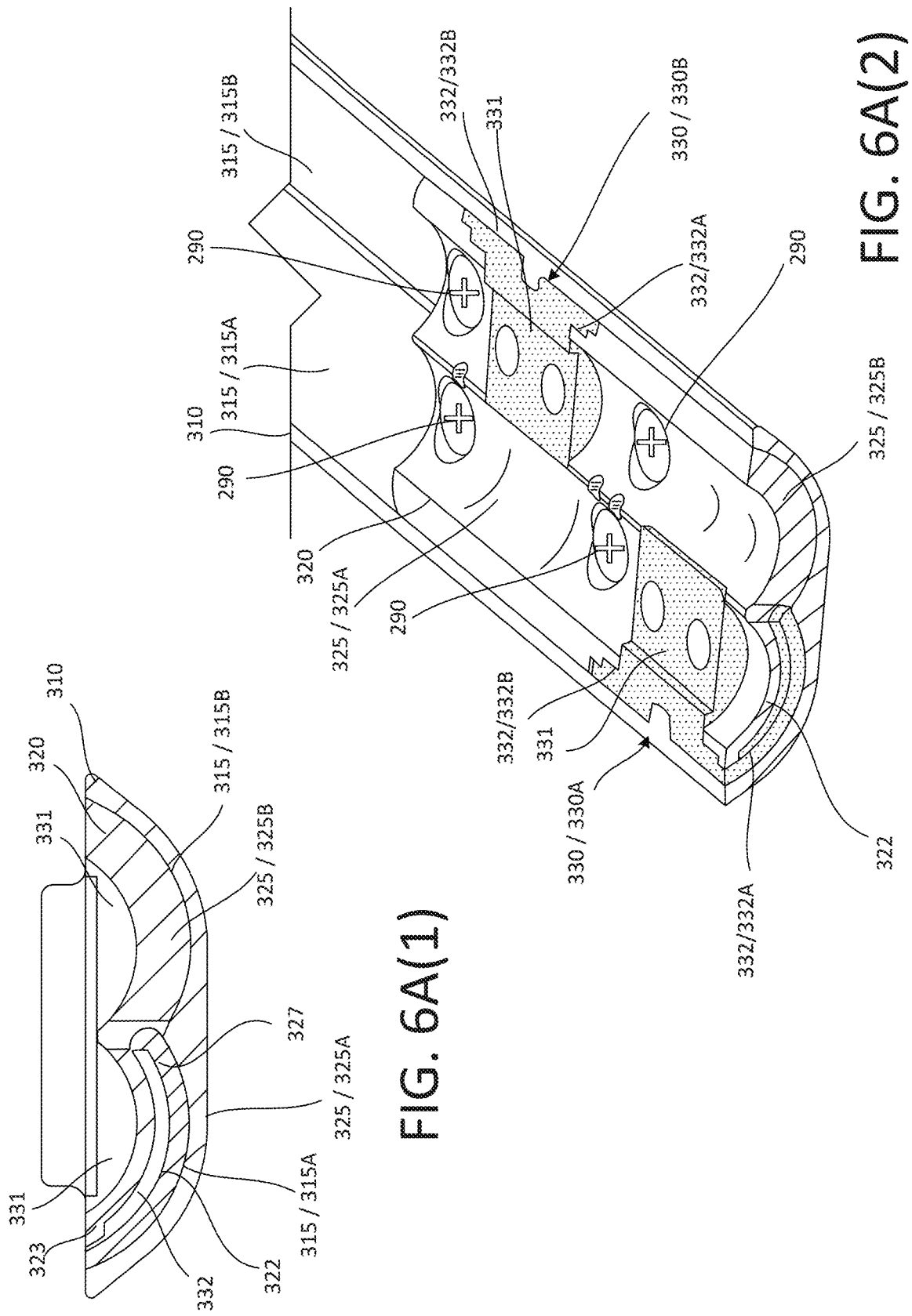
FIG. 6A(1)
FIG. 6A(2)

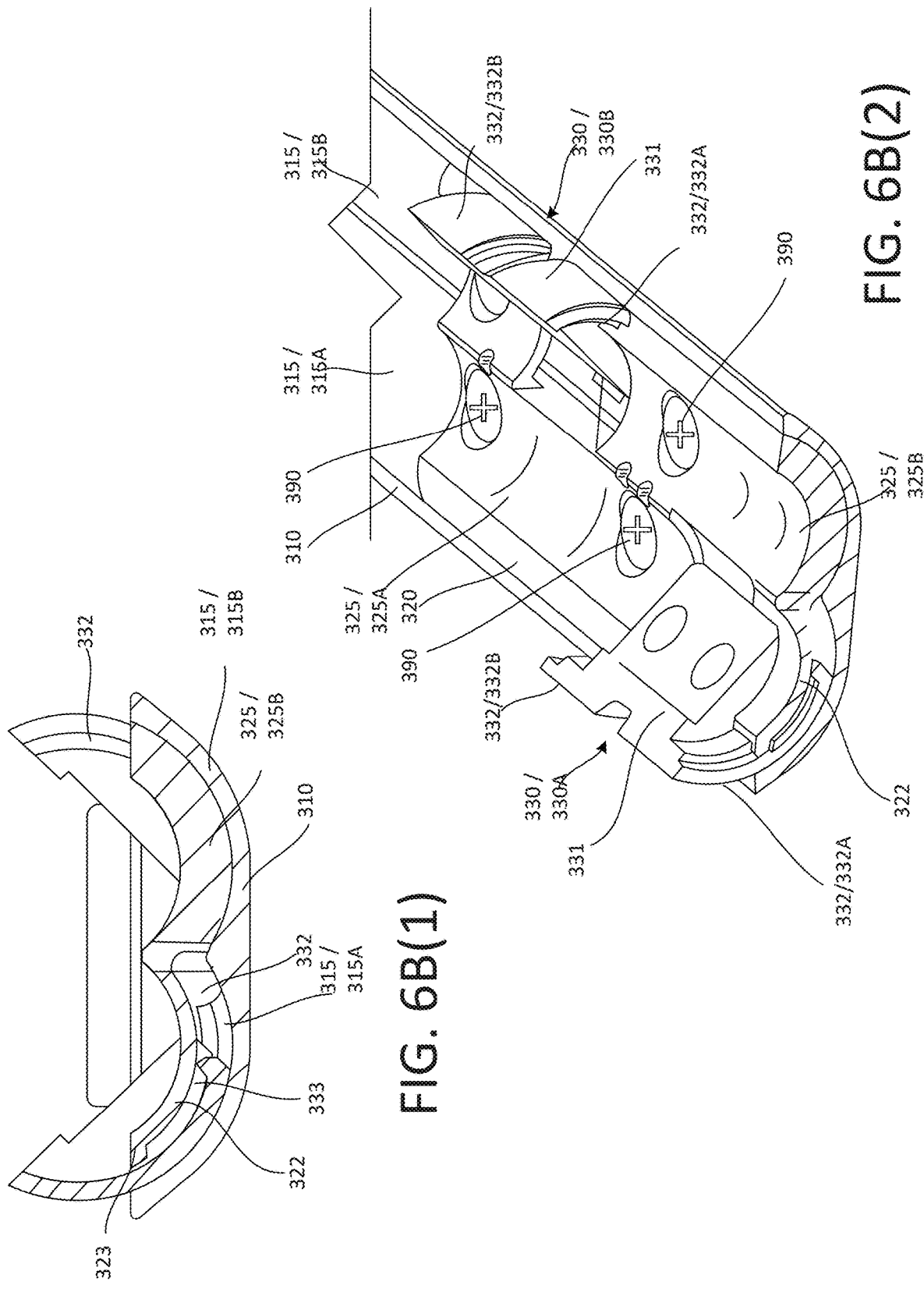

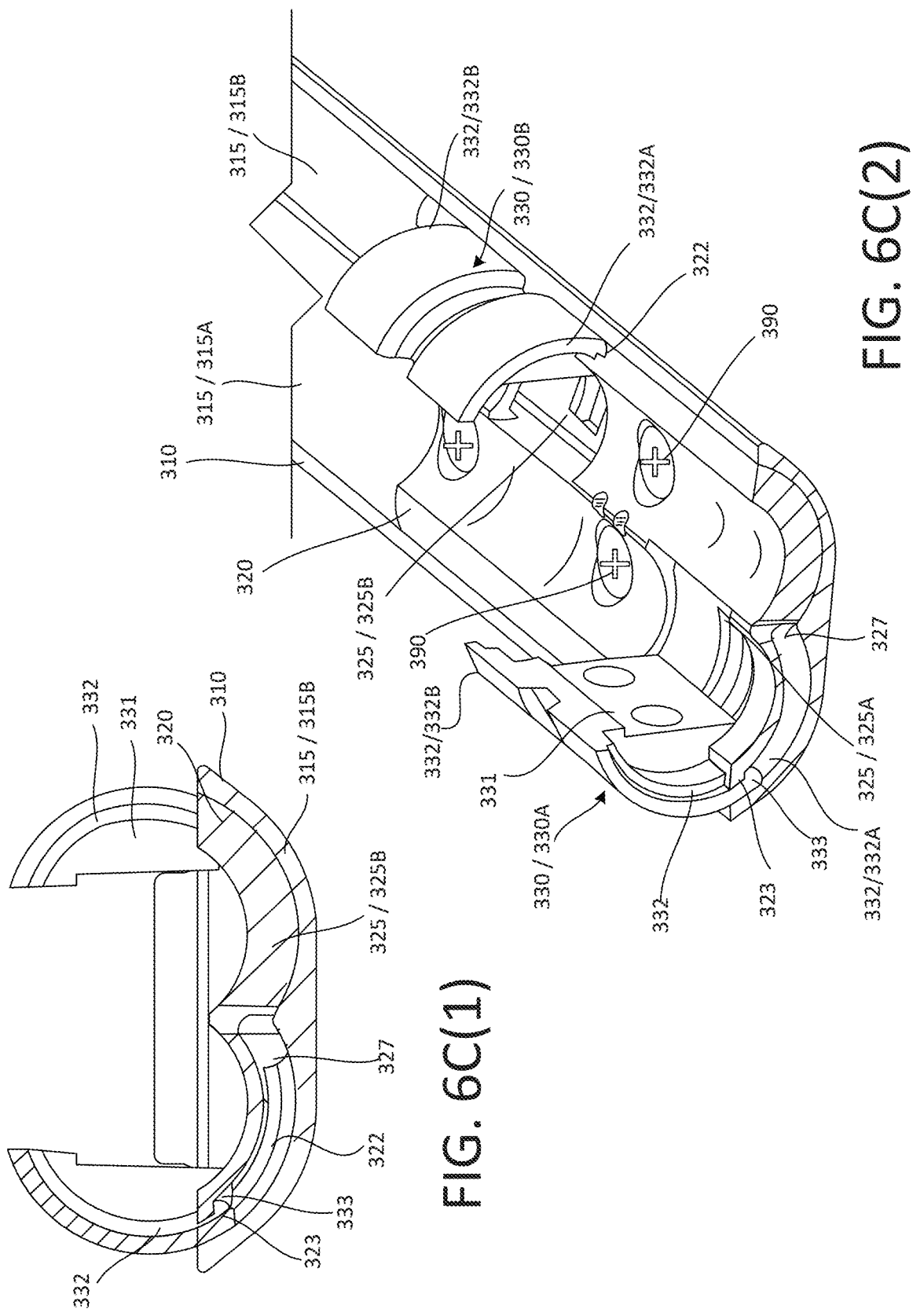

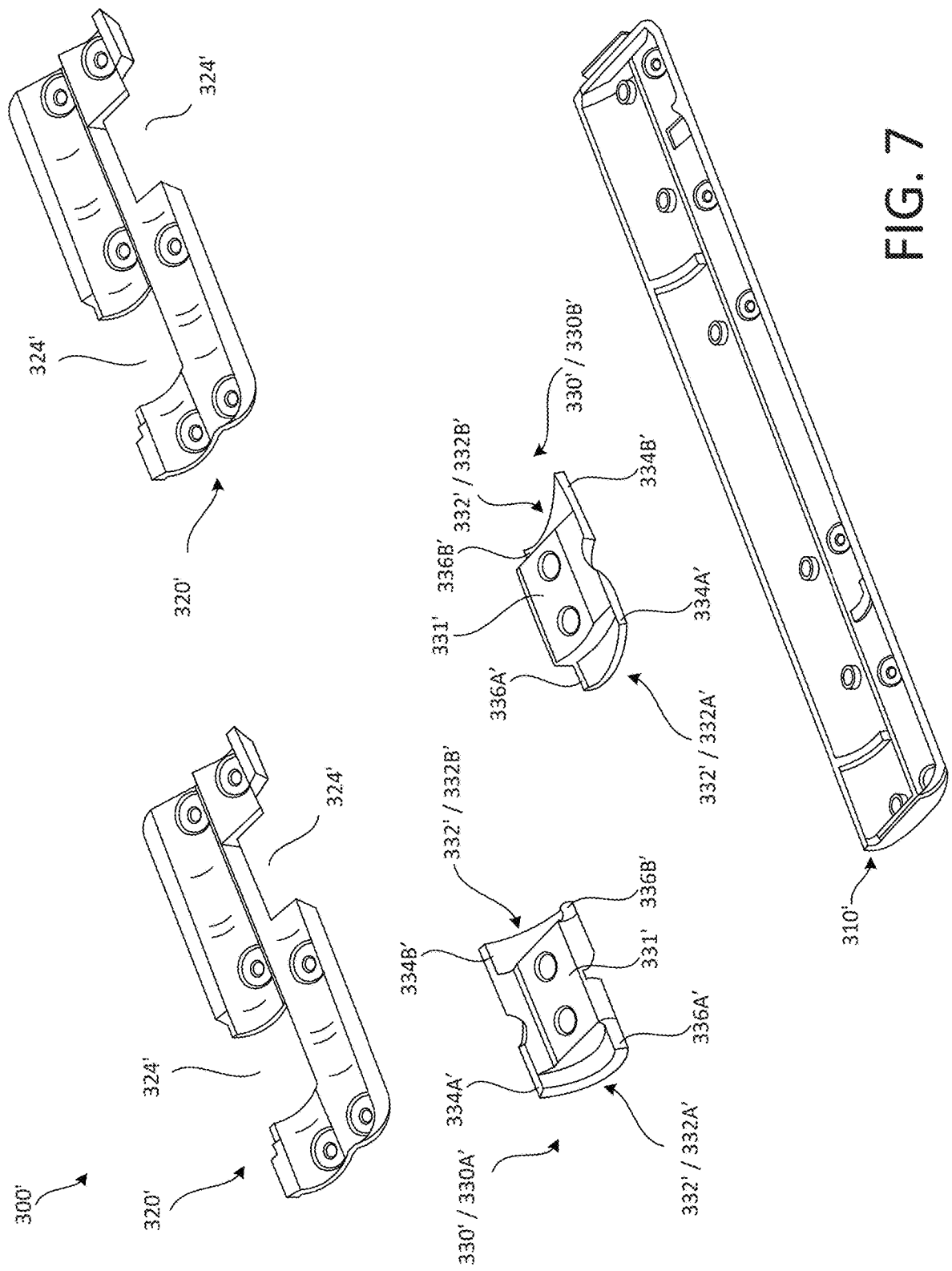

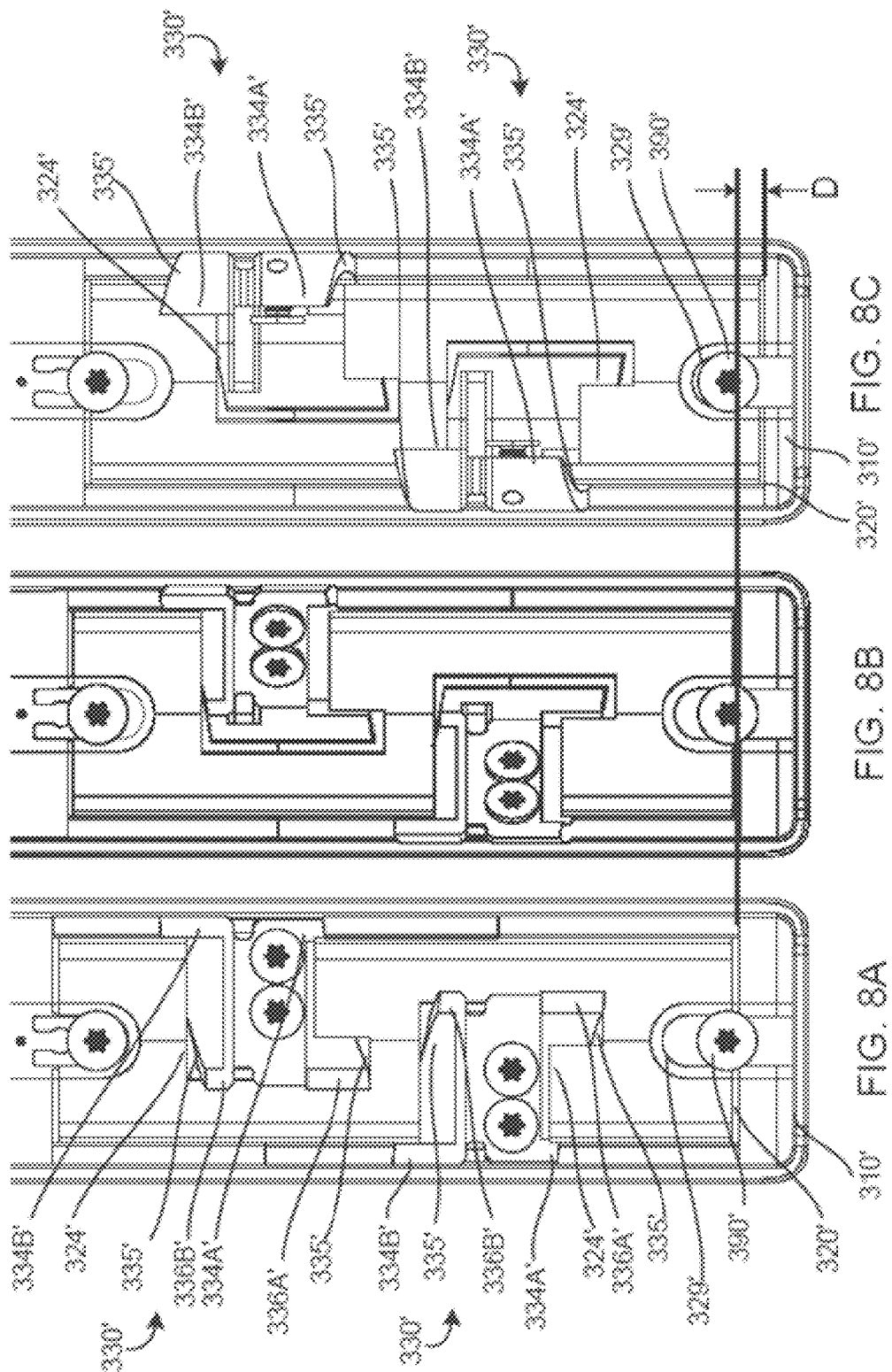

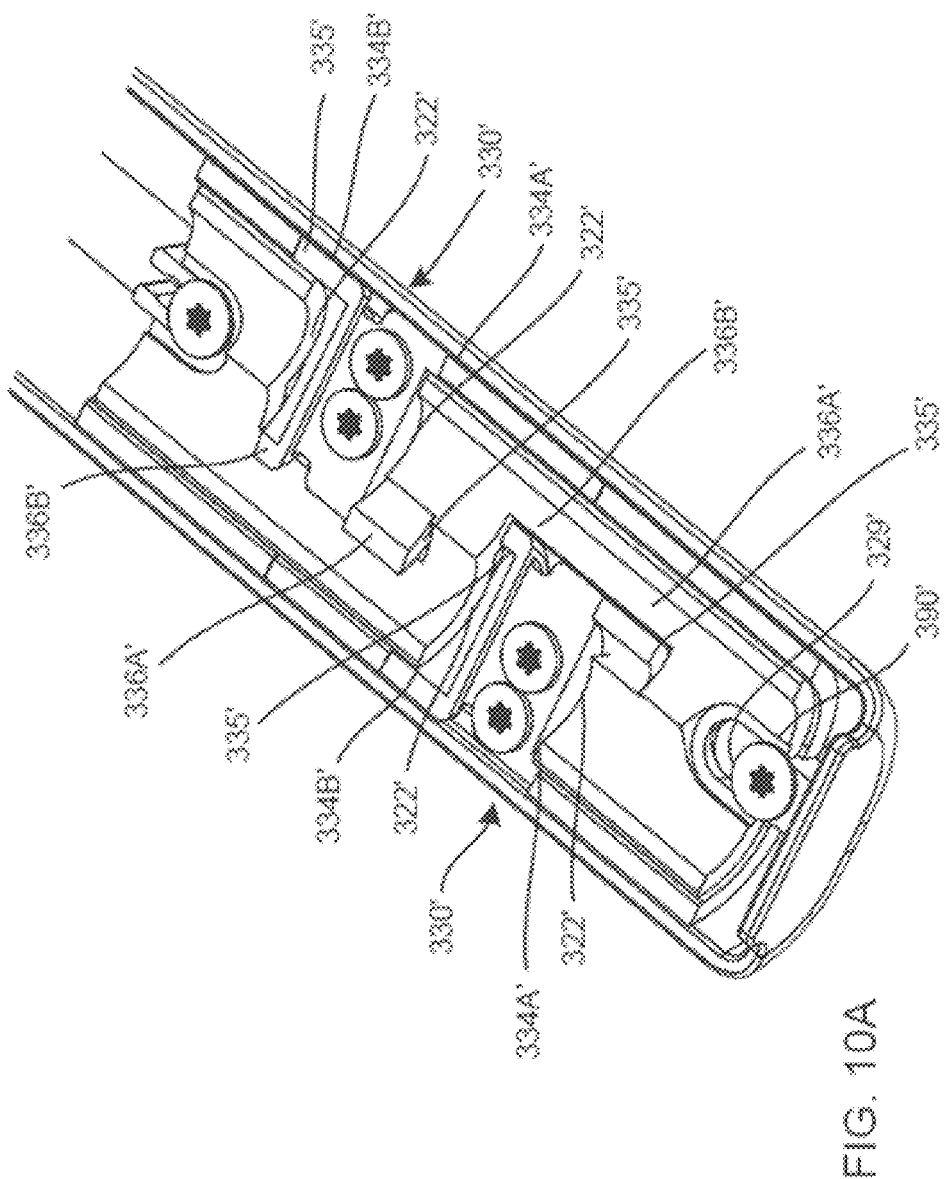

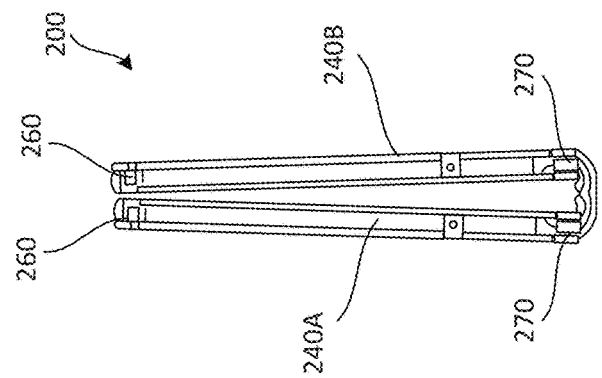
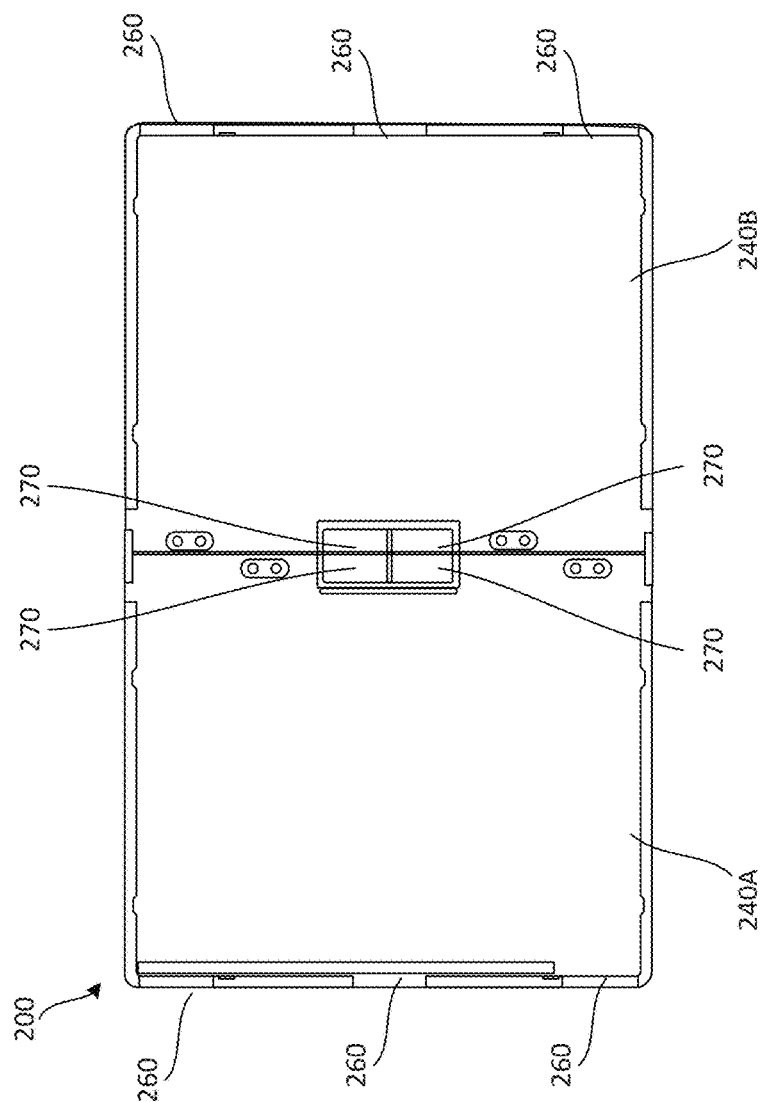
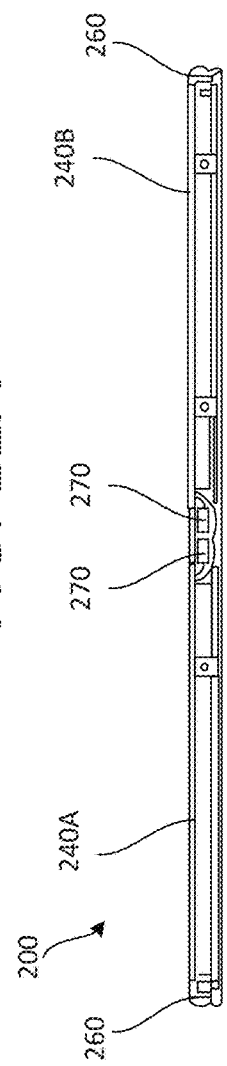
FIG. 12C
FIG. 12A
FIG. 12B

2-AXIS SOFT HINGE MECHANISM AND FOLDABLE DEVICE HAVING SAME

CROSS-REFERENCE TO RELATED APPLICATIONS

This application is a 35 U.S.C. § 371 National Phase Entry Application from PCT/US2020/070466, filed on Aug. 27, 2020, entitled "2-AXIS SOFT HINGE MECHANISM AND FOLDABLE DEVICE HAVING SAME", which claims the benefit of U.S. Provisional Application No. 62/899,485, filed on Sep. 12, 2019, entitled "2-AXIS SOFT HINGE MECHANISM AND FOLDABLE DEVICE HAVING SAME", the disclosures of which are incorporated by reference herein in their entirety.

TECHNICAL FIELD

This description relates, in general, to hinge mechanisms for foldable devices, and, in particular, to hinge mechanisms supporting foldable display systems.

BACKGROUND

Modern computing devices often attempt to achieve a balance between portability and functionality. The desire for a device that provides for a rich display of information on a single surface (suggesting a device having a relatively large form factor) may conflict with the desire to have a device that is small enough to be easily carried and easily accessible (suggesting a device having a relatively small form factor). A flexible, or foldable, display device may enhance the capabilities of a computing device, in that, in a folded configuration, the device may have a relatively small form factor, and in an unfolded configuration, the device may take advantage of a relatively large display area. In some situations, mechanisms guiding and supporting the folding and unfolding of such a device may be relatively complex, and susceptible to failure. These complex mechanisms may produce a somewhat artificial folding motion, and may introduce stress on the foldable device, thus damaging components of the display portion of the foldable device. Flexible support in a bending area of the display portion of the foldable device may provide a more natural folding motion, may maintain a desired contour, or curvature, of the display portion in the folded configuration, and a desired flatness in the unfolded configuration, and may prevent damage due to excessive compression and/or tension exerted on components of the display portion.

SUMMARY

In a general aspect, a hinge mechanism may include a hinge base including a first portion and a second portion, the first portion and the second portion extending longitudinally along a length of the hinge base, and at least one hinge cover coupled to the hinge base. The at least one hinge cover may include a first portion coupled to the first portion of the hinge base, a second portion coupled to the second portion of the hinge base, and a plurality of openings, the plurality of openings, including a first opening formed in the first portion of the hinge cover, and a second opening formed in the second portion of the hinge cover. The hinge mechanism may also include a plurality of rotation pivots rotatably positioned in the plurality of openings in the hinge cover, in a space defined by the hinge base and the hinge cover. The plurality of rotation pivots may include a first rotation pivot positioned at the first opening in the first portion of the hinge cover, and rotatably coupled between the first portion of the hinge base and the first portion of the hinge cover, and a second rotation pivot positioned at the second opening in the second portion of the hinge cover, and rotatably coupled between the second portion of the hinge base and the second portion of the hinge cover.

The at least one hinge cover including a plurality of openings may be equivalent to the at least one hinge cover defining the plurality of openings therein. For example, the first portion of the hinge cover may define the first opening therein and/or the second portion of the hinge cover may define the second opening therein. Each one of the plurality of openings may be open to one side, for example along an outermost longitudinal edge of the hinge cover, such that the respective rotation pivot positioned in the respective opening can rotate through the open side of the hinge cover. For example, each one of the plurality of openings may be defined in the respective part of the hinge cover, between three sides defined by the respective part of the hinge cover.

The respective rotation pivot being rotatably coupled between the respective portion of the hinge base and the respective portion of the hinge cover may refer to the respective rotation pivot being rotatable through the space defined between the respective portion of the hinge base and the respective portion of the hinge cover. The respective rotation pivot being rotatably coupled between the respective portion of the hinge base and the respective portion of the hinge cover may refer to at least a part of the rotation pivot being positioned in the space defined between the respective portion of the hinge base and the respective portion of the hinge cover, such that the rotation pivot is retained in the space, and can rotate through the space. The space may otherwise be referred to as an aperture between the respective portion of the hinge base and the respective portion of the hinge cover. The length of the hinge base may or may not be the longest side of the hinge base.

The first portion of the hinge base and the second portion of the hinge base may be arranged side by side. The length of the first portion of the hinge base may be parallel to the second portion of the hinge base. The first portion of the hinge base and the second portion of the hinge base may be arranged such that the length of the hinge base may be defined by the length of the first portion of the hinge base or the second portion of the hinge base, depending on which is longer or if they are the same length, and a corresponding width of the hinge base may be defined by the combination of the width of the first portion and the width of the second portion. The first portion of the hinge base may be a first longitudinal recess defined in the hinge base. The first portion of the hinge base may define a first curved surface for receiving a respective portion of the hinge cover and a respective rotation pivot. The second portion of the hinge base may be a second longitudinal recess defined in the hinge base. The second portion may define a second curved surface for receiving a respective portion of the hinge cover and a respective rotation pivot. The first curved surface may define a first radius of curvature for a respective rotation pivot to rotate along. The second curved surface may define a second radius of curvature for a respective rotation pivot to rotate along. The first and second radiuses of curvatures may be the same or they may be different.

Implementations can include one or more of the following features, in isolation, or in any combination with each other. For example, in some implementations, the hinge mechanism may be configured to be coupled in a computing device that includes a foldable display at a portion of the computing device corresponding to a bendable section of the foldable display. In some implementations, each first rotation pivot may be configured to be coupled to a first housing of the computing device, such that the first housing rotates together with the first rotation pivot relative to the hinge base and the hinge cover. The first housing rotating in this way may move the first housing between an unfolded configuration and a folded configuration. Each second rotation pivot may be configured to be coupled to a second housing of the computing device, such that the second housing rotates together with the second rotation pivot relative to the hinge base and the hinge cover. The second housing rotating in this way may move the second housing between an unfolded configuration and a folded configuration. When the first and second housings are in their unfolded configurations, the computing device may be in its unfolded configuration, and when the first and second housings are in their folded configurations, the computing device may be in its folded configuration. In some implementations, the hinge mechanism may be configured to rotate the first housing and the second housing between an unfolded configuration of the computing device and a folded configuration of the computing device.

The rotation pivots may be configured to rotate between a retracted position and an extended position. In some implementations, in an unfolded configuration of the hinge mechanism, the first rotation pivot may be in a retracted position, in which the first rotation pivot is received in the space defined by the first portion of the hinge base and the first portion of the hinge cover defining the first opening, and the second rotation pivot may be in a retracted position, in which the second rotation pivot is received in the space defined by the second portion of the hinge base and the second portion of the hinge cover defining the second opening. When in the retracted position, the respective rotation pivot may be fully received in its respective space. The respective rotation pivot may rotate between the retracted position and a respective extended position. In a respective extended position, the rotation pivot may only be partially received in its respective space. The retracted position may refer to a position in which the respective rotation pivot is enclosed within the hinge base, and the extended position may refer to a position in which the respective rotation pivot is not enclosed within the hinge base. When the first rotation pivot is in the retracted position and the second rotation pivot is in the retracted position, the first and second rotation pivots define a surface that is substantially parallel with a surface defined by outer edges of the hinge base. When the first rotation pivot is in the retracted position and the second rotation pivot is in the retracted position, the first rotation pivot and the second rotation pivot are held within the first and second portions of the hinge base respectively, such that a surface defined by the hinge base, the hinge cover and the first and second rotation pivots is substantially planar. In some implementations, in a folded configuration of the hinge mechanism, the first rotation pivot may be in an extended position, in which the first rotation pivot is rotated through the first opening formed in the first portion of the hinge cover and out of the space defined by the first portion of the hinge base and the first portion of the hinge cover defining the first opening, and the second rotation pivot may be in an extended position, in which the second rotation pivot is rotated through the second opening in the second portion of the hinge cover, and out of the space defined by the second portion of the hinge base and the second portion of the hinge cover defining the second opening. When the first rotation pivot is in the extended position and the second rotation pivot is in the extended position, the first and second rotation pivots each define a surface that is angled and/or substantially perpendicular with a surface defined by outer edges of the hinge base. The retracted position of the rotation pivots may correspond with an unfolded configuration of the hinge mechanism and the computing device and the extended position of the rotation pivots may correspond with a folded configuration of the hinge mechanism and the computing device.

In some implementations, each rotation pivot, of the plurality of rotation pivots, may include a body portion, a first flange defined along a first lateral side of the body portion, and a second flange defined along a second lateral side of the body portion, opposite the first lateral side thereof. The hinge base may define an axis or a longitudinal axis, perhaps along its length. The hinge base may define a first end and a second end along this axis. When the rotation pivots are received within the hinge base, the lateral sides may be parallel to this axis. When the rotation pivots are received within the hinge base, the first lateral side may be closer to the first end or the second end, and the second first lateral side may be closer to the second end or the first end respectively.

The hinge mechanism may further comprise an inclined surface along an outer peripheral edge portion of at least one of the first flange or the second flange, such that a width of the at least one the first flange or the second flange at a first end portion thereof may be greater than a width of the at least one of the first flange or the second flange at a second end portion thereof. The at least one of the first flange or the second flange may be slidably received in a track defined along an edge portion of the opening in which the corresponding rotation pivot is received, and the track may guide a sliding movement of the at least one of the first flange or the second flange as the rotation pivot rotates. The track may guide the at least one of the first flange or the second flange as the rotation pivot rotates, to move the rotation pivot between a first position and a second position, wherein moving the rotation pivot between the first position and the second position moves the hinge mechanism between the unfolded and the folded configuration. The inclined surface of the at least one of the first flange or the second flange may interact with a corresponding surface of the track as the rotation pivot rotates, such that the rotation pivot and the hinge cover may move in a first longitudinal direction relative to the hinge base in response to rotation of the rotation pivot in a first direction in which the width of the at least one of the first flange or the second flange increases, and the rotation pivot and the hinge cover may move in a second longitudinal direction relative to the hinge base in response to rotation of the rotation pivot in a second direction in which the width of the at least one of the first flange or the second flange decreases.

Each opening, of the plurality of openings in the hinge cover, may include a first track defined in and/or along a first peripheral edge portion of the opening. The first track may be configured to slidably receive the first flange of a corresponding rotation pivot received therein. Each opening may include a second track defined in and/or along a second peripheral edge portion of the opening, opposite the first peripheral edge portion thereof. The second track may be configured to slidably receive the second flange of a corresponding rotation pivot received therein.

In some implementations, an outer peripheral contour of the first flange may correspond to an inner peripheral contour of the first track, and an outer peripheral contour of the second flange may correspond to an inner peripheral contour of the second track. In some implementations, the first track may guide a sliding movement of the first flange, and the second track may guide a sliding movement of the second flange as the rotation pivot rotates from a first position, in which the hinge mechanism is in an unfolded configuration, and a second position, in which the hinge mechanism is in an unfolded configuration. In some implementations, in the unfolded configuration, the rotation pivot may be in a retracted position in which the rotation pivot is received in the corresponding space between the hinge base and the hinge cover, and, in the folded configuration, the rotation pivot may be in an extended position in which the rotation pivot is rotated through the corresponding opening and out of the space defined by the hinge base and the hinge cover.

In some implementations, the hinge mechanism may include a first stopping mechanism that restricts at least one of movement of the first flange in the first track or movement of the second flange in the second track, in the unfolded configuration, and a second stopping mechanism that restricts at least one of, movement of the first flange in the first track or movement of the second flange in the second track, in the folded configuration. In some implementations, the first stopping mechanism may include at least one of a closed terminal end of the first track that restricts further sliding movement of the first flange in an unfolding direction, or a closed terminal end of the second track that restricts further sliding movement of the second flange in an unfolding direction, so as to restrict rotation of the hinge mechanism beyond a maximum bending radius. In some implementations, the second stopping mechanism may include at least one of a track protrusion formed at an open end portion of the first track that engages a pivot protrusion formed at a terminal end portion of the first flange to restrict further sliding movement of the first flange in a folding direction, or a track protrusion formed at an open end portion of the second track that engages a pivot protrusion formed at a terminal end portion of the second flange to restrict further sliding movement of the second flange in a folding direction, so as to restrict rotation of the hinge mechanism beyond a minimum bending radius.

In another general aspect, a hinge mechanism for a computing device including a foldable display coupled to a housing, includes: a hinge base including a first longitudinal recess and a second longitudinal recess; a hinge cover coupled to the hinge base, the hinge cover including a first portion coupled to the first recess of the hinge base and a second portion coupled to the second recess of the hinge base; a plurality of rotation pivots rotatably coupled between the hinge base and the hinge cover. The plurality of rotation pivots include a first rotation pivot and a second rotation pivot. The first rotation pivot is rotatably coupled in a space formed between the first recess of the hinge base and the first portion of the hinge cover and configured to be coupled to a first portion of the housing of the computing device through a first opening formed in the first portion of the hinge cover. The second rotation pivot is rotatably coupled in a space formed between the second recess of the hinge base and the second portion of the hinge cover and configured to be coupled to a second portion of the housing of the computing device through a second opening formed in the second portion of the hinge cover.

Each rotation pivot, of the plurality of rotation pivots, may include: a body portion; a first flange defined along a first lateral side of the body portion; and a second flange defined along a second lateral side of the body portion, opposite the first lateral side thereof. The hinge mechanism may further comprise an inclined surface along an outer peripheral edge portion of at least one of the first flange or the second flange, such that a width of the at least one the first flange or the second flange at a first end portion thereof may be greater than a width of the at least one of the first flange or the second flange at a second end portion thereof. The at least one of the first flange or the second flange may be slidably received in a track defined along an edge portion of the opening in which the corresponding rotation pivot is received, and the track may guide a sliding movement of the at least one of the first flange or the second flange as the rotation pivot rotates. The inclined surface of the at least one of the first flange or the second flange may interact with a corresponding surface of the track as the rotation pivot rotates, such that the rotation pivot and the hinge cover may move in a first longitudinal direction relative to the hinge base in response to rotation of the rotation pivot in a first direction in which the width of the at least one of the first flange or the second flange increases, and the rotation pivot and the hinge cover may move in a second longitudinal direction relative to the hinge base in response to rotation of the rotation pivot in a second direction in which the width of the at least one of the first flange or the second flange decreases. In an unfolded configuration, each of the plurality of rotation pivots may be in a retracted position in which the plurality of rotation pivots is received in a corresponding space between the hinge base and the hinge cover. In a folded configuration, each of the plurality of rotation pivots may be in an extended position in which the plurality of rotation pivots is rotated through a corresponding opening in the hinge cover and out of the space defined by the hinge base and the hinge cover.

Another general aspect may provide a computing device comprising: a foldable display coupled to a housing having a first portion and a second portion; and a hinge mechanism as described herein, for example in any general aspects, implementations or otherwise. The first rotation pivot of the hinge mechanism is coupled to the first portion of the housing through the first opening of the hinge mechanism, and the second rotation pivot of the hinge mechanism is coupled to the second portion of the housing through the second opening of the hinge mechanism.

BRIEF DESCRIPTION OF THE DRAWINGS

FIGS. 3A-4B illustrate the determination of a fixed center of rotation of a device body, in accordance with implementations described herein.

FIGS. 6A(1) through 6C(2) are cross-sectional views of the exemplary hinge mechanism 300, taken along line N-N of FIG. 5B, in accordance with implementations described herein.

FIG. 7 is an exploded perspective view of an exemplary hinge mechanism including an exemplary pair of rotation pivots, in accordance with implementations described herein;

FIGS. 8A-8C are top views of the exemplary hinge mechanism, in accordance with implementations described herein.

FIGS. 10A-10C are perspective views of the exemplary hinge mechanism shown in FIGS. 8A-8C, in accordance with implementations described herein.

FIG. 12A is a top view, and FIG. 12B is a side view, of a computing device including a hinge mechanism, in an unfolded configuration, and FIG. 12C is a side view of the computing device including the hinge mechanism, in a folded configuration, in accordance with implementations described herein.

DETAILED DESCRIPTION

A computing device including a hinge mechanism, in accordance with implementations, as described herein, may provide a relatively simple, and a relatively reliable, mechanism to support and guide the folding and the unfolding of a foldable display of the computing device, using a relatively natural folding and unfolding motion. In some implementations, the hinge mechanism may maintain the foldable display within allowable bending radius limits, both in the folded configuration and in the unfolded configuration, of the computing device. In some implementations, the hinge mechanism may maintain a desired degree of planarity of the foldable display in the unfolded configuration of the computing device. In some implementations, the hinge mechanism may allow for a reduced stacking thickness in the folded configuration, while maintaining the foldable display within allowable bending radius limits. The relatively simple and reliable hinge mechanism, in accordance with implementations described herein, may guide and support the natural folding and unfolding of the computing device including the foldable display, while still providing support to the foldable display, and while still maintaining the foldable display within allowable bending radius limits.

A foldable device may include a foldable layer and a hinge mechanism. The hinge mechanism may include a hinge cover fixedly coupled to a hinge base. A plurality of rotation pivots may be rotatably coupled to the hinge base and the hinge cover. A housing of a computing device may be coupled to the rotation pivots, such that, as the rotation pivots rotate into the hinge base and hinge cover, the computing device is unfolded, and as the rotation pivots rotate out of the hinge base and hinge cover, the computing device is folded. Rotation of the rotation pivots into and out of the hinge base and hinge cover may be restricted by one or more stopping mechanisms, so as to maintain a foldable display of the computing device within allowable bending limits.

Figure 1A:
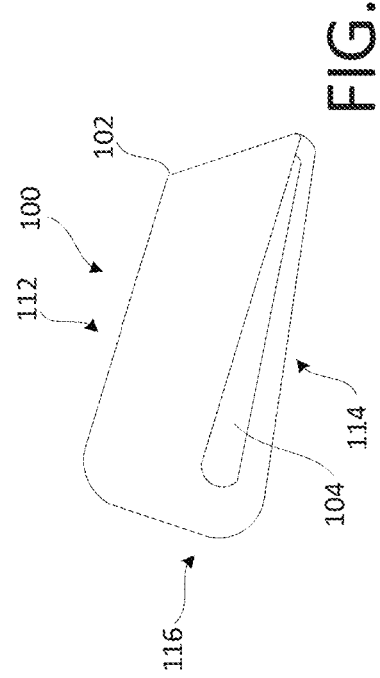
FIGS. 1A-1D illustrate an exemplary computing device including an exemplary foldable display.
Figure 1C:
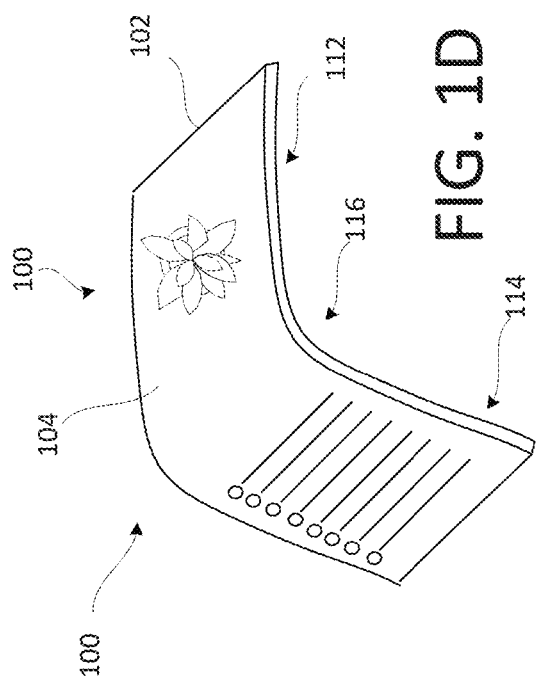
Figure 1B:
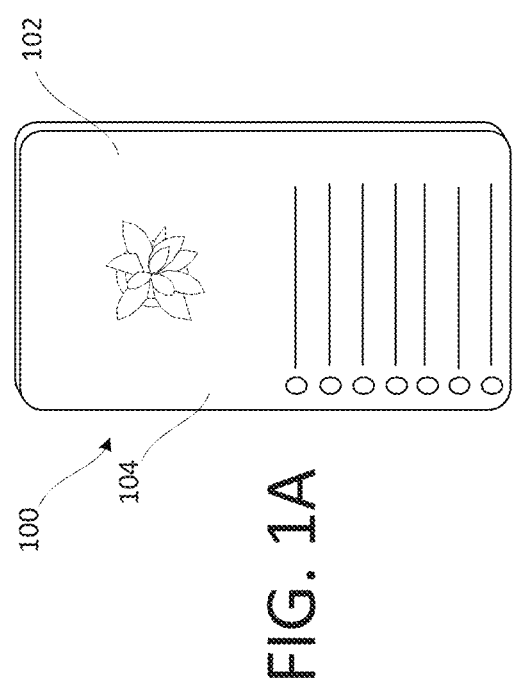
Figure 1D:
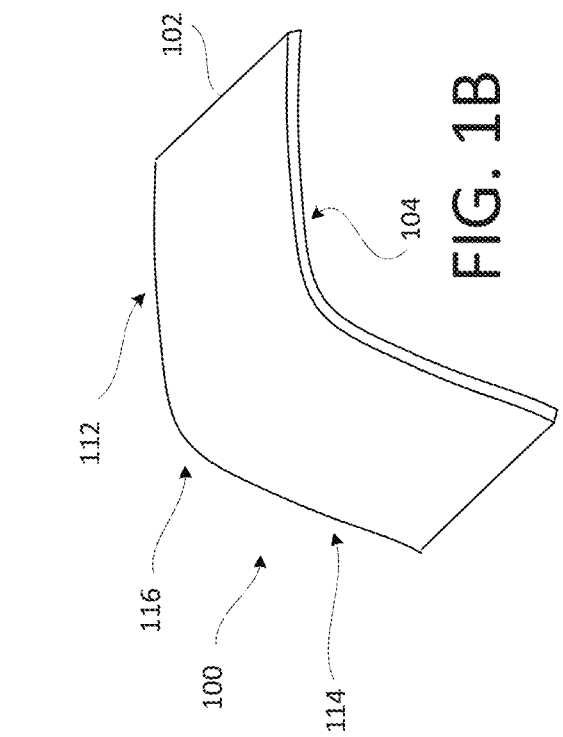

FIGS. 1A-1D illustrate an exemplary computing device 100 that includes a foldable layer 102. In particular, FIG. 1A is a front view of the exemplary computing device 100 in an unfolded configuration. FIG. 1B is a perspective view of the exemplary computing device 100 in a partially folded configuration. FIG. 1C is a side view of the exemplary computing device 100 in a fully folded configuration. FIG. 1D is a perspective view of the exemplary computing device 100 in a partially folded configuration. In the exemplary computing device 100 shown in FIGS. 1B and 1C, the foldable layer 102 is a foldable display 102 that is mounted so that a display surface 104 faces inward in the folded configuration. In the exemplary computing device 100 shown in FIG. 1D, the foldable layer 102 is a foldable display 102 that is mounted so that a display surface 104 faces outward in the folded configuration. The foldable display 102 can include a flexible organic light emitting diode (OLED) layer.

In some implementations, the foldable display 102 can include a first relatively flat, relatively rigid, or-semi-rigid, section 112, a second relatively flat, relatively rigid, or semi-rigid, section 114, and a foldable portion or bendable section 116. In some implementations, the foldable display 102 can include more than two flat, rigid sections 112, 114 and/or more than one bendable section 116. In some implementations, the foldable display 102 can include zero, or only one, flat rigid section 112, 114. For example, when a foldable display 102 includes zero flat rigid sections, the foldable display 102 may be substantially continuously bendable, and may be rolled up, as in a scroll. The exemplary foldable display 102 shown in FIGS. 1A-1D includes an exemplary bendable section 116 that allows the foldable display 102 to bend about an axis. In some implementations, the foldable display 102 can include more than one bendable section that allows the flexible display 102 to bend about more than one axis.

In the exemplary computing device 100 shown in FIGS. 1A-1D, the bendable section 116 may allow the foldable display 102 to bend, or fold, for example, in an arcuate shape, that has a bending radius, and/or radius of curvature. In some implementations, a hinge mechanism, in accordance with implementations described herein, may support and guide a folding and an unfolding of the foldable display 102 at the bendable section 116. In some implementations, the hinge mechanism, in accordance with implementations described herein, may be installed in the computing device 100, at a position corresponding to the bendable section 116 of the foldable display 102. In some implementations, the hinge mechanism may limit or restrict folding or bending of the foldable display 102 to within allowable bending parameters, to prevent damage to fragile components of the foldable display 102. For example, in the folded configuration shown in FIG. 1C, the hinge mechanism may prevent the foldable display 102 from bending beyond a minimum bending radius (e.g., less than approximately 10 millimeters, less than approximately 5 millimeters, or less than approximately 2 millimeters). In the unfolded configuration shown in FIG. 1A, the hinge mechanism may prevent the foldable display from bending beyond a maximum bending radius.

Figure 2A:
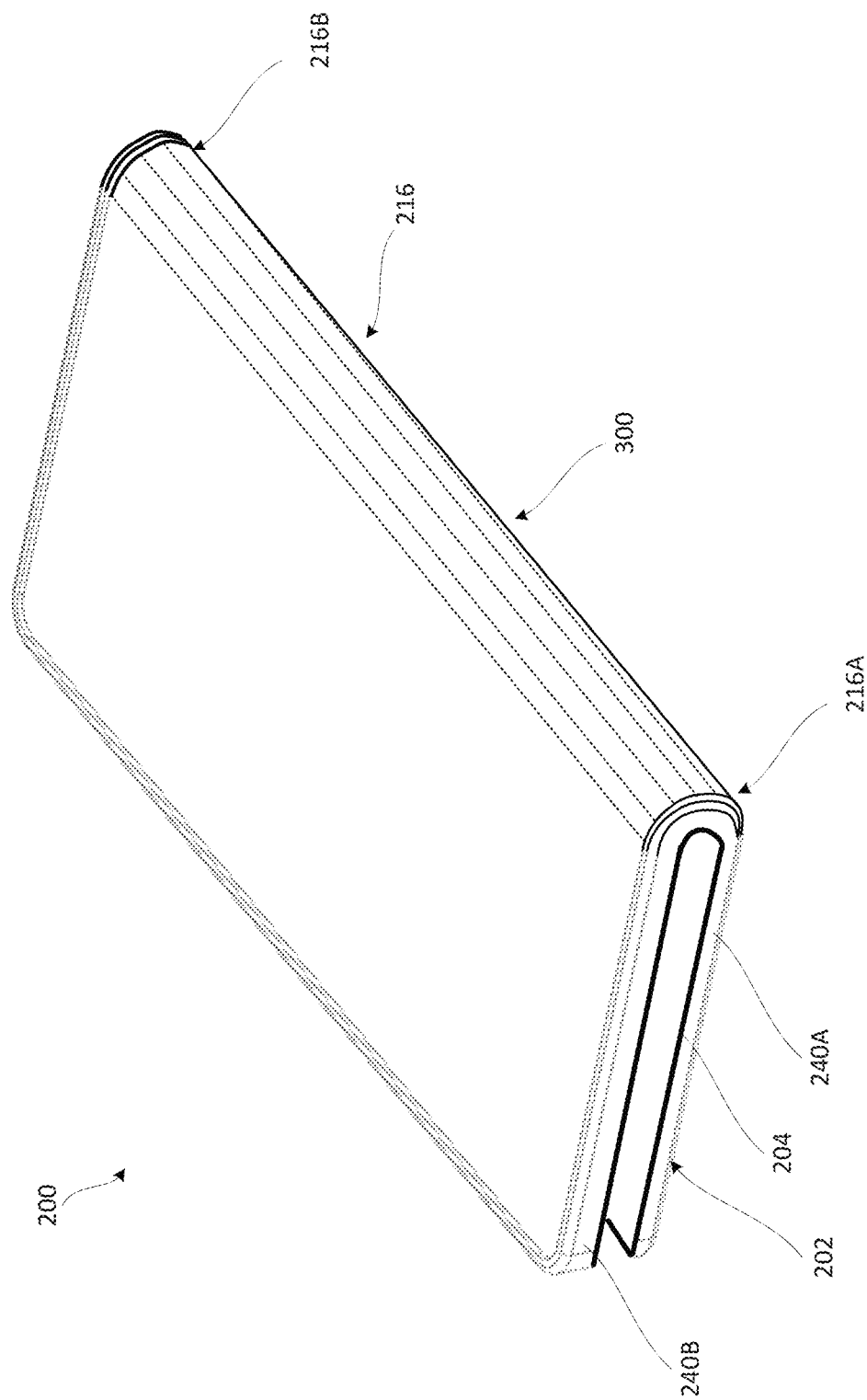
FIGS. 2A and 2B are perspective views of an exemplary computing device including an exemplary hinge mechanism, in a folded configuration and in an unfolded configuration, respectively, in accordance with implementations described herein.
Figure 2B:
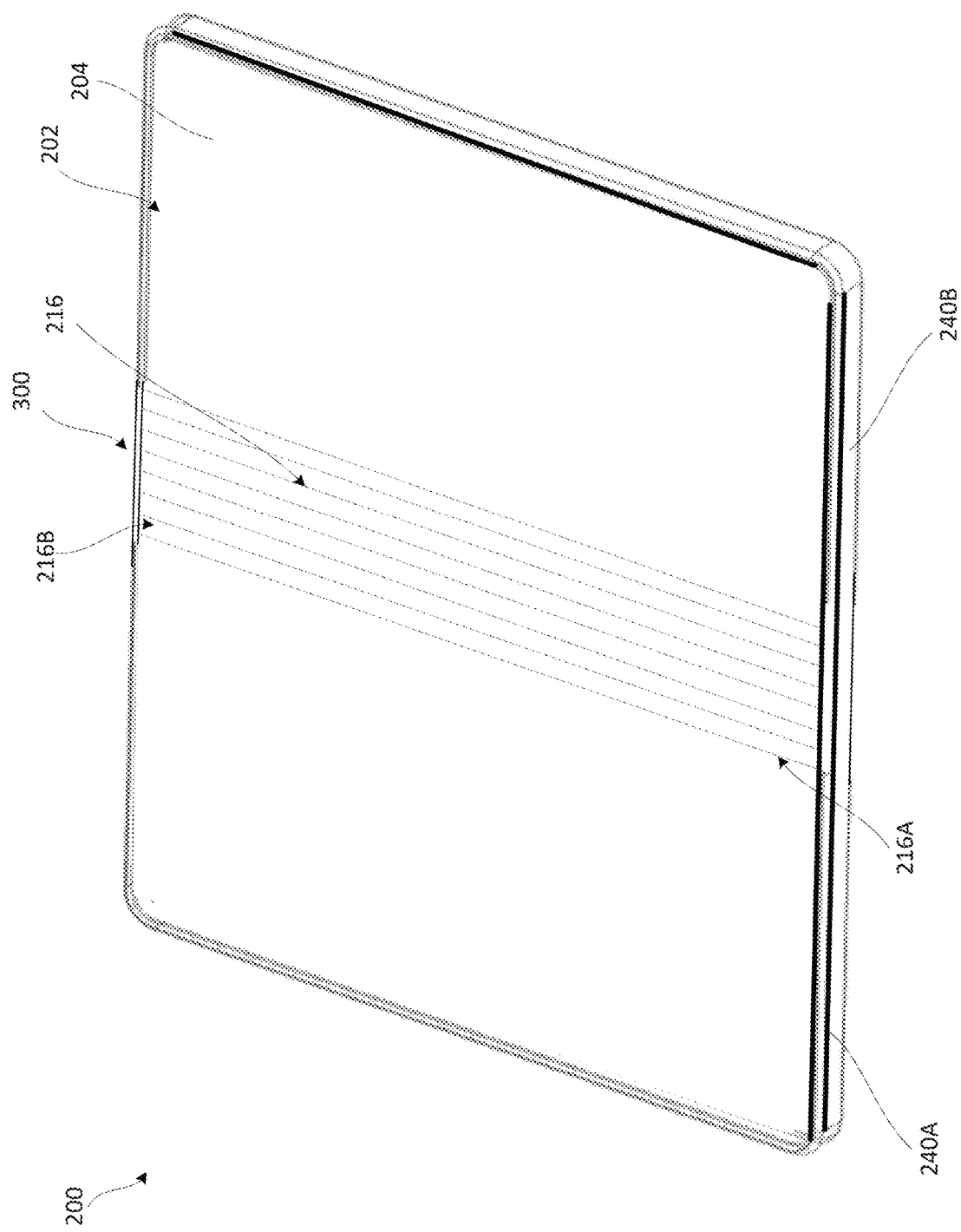

FIGS. 2A and 2B are perspective views of an exemplary computing device 200 including a foldable layer 202, such as, for example, a foldable display 202, supported by an exemplary hinge mechanism 300, in accordance with implementations described herein. The exemplary hinge mechanism 300 may be received in a housing 240 of the computing device 200, and positioned within the housing 240 at a position corresponding to a foldable portion 216, or bendable section 216 of the foldable display 202, for example, between a first housing 240A and a second housing 240B of the computing device 200. In FIG. 2A, the exemplary computing device 200 is in the folded configuration. In FIG.

2B, the exemplary computing device 200 is in the unfolded configuration. In the exemplary computing device 200 shown in FIGS. 2A and 2B, the foldable display 202 is mounted on the computing device 200 so that a display surface 204 of the foldable display 202 faces inward when the device 200 is in the folded configuration. However, in some implementations, the foldable display 202 may be mounted so that the display surface 204 faces outward when the device 200 is in the folded configuration (not shown).

In the exemplary computing device 200 shown in FIGS. 2A and 2B, the bendable section 216 of the foldable display 202 is at a central portion of the computing device 200, simply for purposes of discussion and illustration. In some implementations, the bendable section 216 may be located at positions other than the central portion of the computing device 200, and/or the foldable display 202 can include more bendable sections. In some implementations, the foldable display 202 can be substantially continuously bendable. In the exemplary foldable display 202 shown in FIGS. 2A and 2B, the bendable section 216 allows the foldable display 202 to bend about an axis.

The hinge mechanism 300, in accordance with implementations described herein, may be located in the computing device 200, at a position corresponding to the bendable section 216 of the foldable display 202. The hinge mechanism 300 may support and guide the folding and the unfolding of the foldable display 202. That is, the hinge mechanism 300 may provide for a relatively natural folding and unfolding motion between the folded configuration shown in FIG. 2A and the unfolded configuration shown in FIG. 2B. In some implementations, the hinge mechanism 300 may limit, or restrict, an amount of bending or folding in the folded configuration, to prevent the foldable display 202 from bending beyond a minimum bending radius of the foldable display 202, and/or from bending beyond a maximum bending radius of the foldable display 202, which may result in damage to fragile components of the foldable display 202.

A computing device including a hinge mechanism, in accordance with implementations described herein, may support and guide a folding and unfolding of a foldable display of the computing device, while also maintaining the foldable display within allowable bending limits, and providing for planarity in a bendable section of the foldable display in the unfolded configuration. The hinge mechanism, in accordance with implementations described herein, may utilize a no-torque design, that allows for a natural feeling folding and unfolding of the computing device including the foldable display. In developing a hinge mechanism to accomplish this, particularly without the use of complex gearing and/or sliding mechanisms, a center of rotation of the foldable display, a minimum bending radius of the foldable display, and other such factors may be taken into consideration.

For example, FIGS. 3A and 3B illustrate an exemplary computing device 20 including a foldable display 22 coupled to a first body 24A and a second body 24B of the computing device 20. In FIGS. 3A and 3B, the exemplary computing device 20 is shown in the folded configuration in solid lines, and in the unfolded configuration in dotted lines. In FIG. 3A, the first and second bodies 24A, 24B are slidably coupled to the foldable display 22. In FIG. 3B, the first and second bodies 24A, 24B are fixed, or adhered to the foldable display 22. To move from the unfolded configuration (in dotted lines) to the folded configuration (solid lines), the foldable display 22 is rotated about a center of rotation C of the foldable display 22. However, in moving from the unfolded configuration to the folded configuration, the center of rotation of the first body 24A and the second body 24B is not the same as the center of rotation C of the foldable display 22, requiring movement, for example, sliding movement of the first and second bodies 24A, 24B in order to accommodate the folding and unfolding of the foldable display 22. This results in a stroke distance D, compared to an arrangement in which the first and second bodies 24A, 24B and the foldable display 22 are adhered to the foldable display, as shown in FIG. 3B. To reduce, or minimize, or substantially eliminate this stroke distance D, a center of rotation of the first and second bodies 24A, 24B of the computing device 20 may be determined. A hinge mechanism, in accordance with implementations described herein, may allow the first and second bodies 24A, 24B to rotate about their respective centers of rotation, while the foldable display 22 rotates about its center of rotation C. Determination of the individual center(s) of rotation to accommodate the folding and unfolding of the foldable display 22 to account for this difference will be described in more detail with respect to FIGS. 4A and 4B.

FIGS. 4A and 4B illustrate the rotation of the exemplary computing device 20 shown in FIGS. 3A and 3B, from an initial (unfolded, shown in dotted lines) position to a final (folded, shown in solid lines) position. FIGS. 4A and 4B illustrate only the movement of one of the first/second bodies 24A/24B of the computing device 20, from the initial (unfolded) position to the final (folded) position, simply for ease of discussion and illustration. The principles to be described apply to the determination of the center of rotation of each of the first body 244A and the second body 24B in a similar manner. Thus, the description of FIGS. 4A and 4B will simply reference a device body.

As shown in FIGS. 4A, and 4B, reference points A and B may be designated on the device body 24, for example, at upper and lower end portions of the rotating end of the device body 24. In rotating the device body 24 from the initial position, through the angle θ to the final position, the first reference point moves from an initial position A1 to a final position A2. Similarly, the second reference point moves from an initial position B1 to a final position B2. A line A1-A2 may be drawn connecting the points A1 and A2, and then a first line L1, bisecting the line A1-A2, may be drawn, as shown in FIG. 4A. A line B1-B2 may be drawn connecting the points B1 and B2, and then a second line L2, bisecting the line B1-B2, may be drawn, as shown in FIG. 4B. The point X at which the first line L1 and the second line L2 defines the center of rotation X of the device body 24. As noted above, the process described above with respect to FIGS. 4A and 4B may be applied similarly to the first body 24A to determine a center of rotation of the first body 24A, and to the second body 24B to determine a center of rotation of the second body 24B (that is different from that of the first body 24A). In this example, the exemplary reference points A and B are positioned at corners of the device body 24, simply for ease of discussion and illustration. However, in some implementations, other reference points may be selected at the rotational end portion of the device body 24, and the process described above may be used to determine the center of rotation X of the device body 24.

Figure 5A:
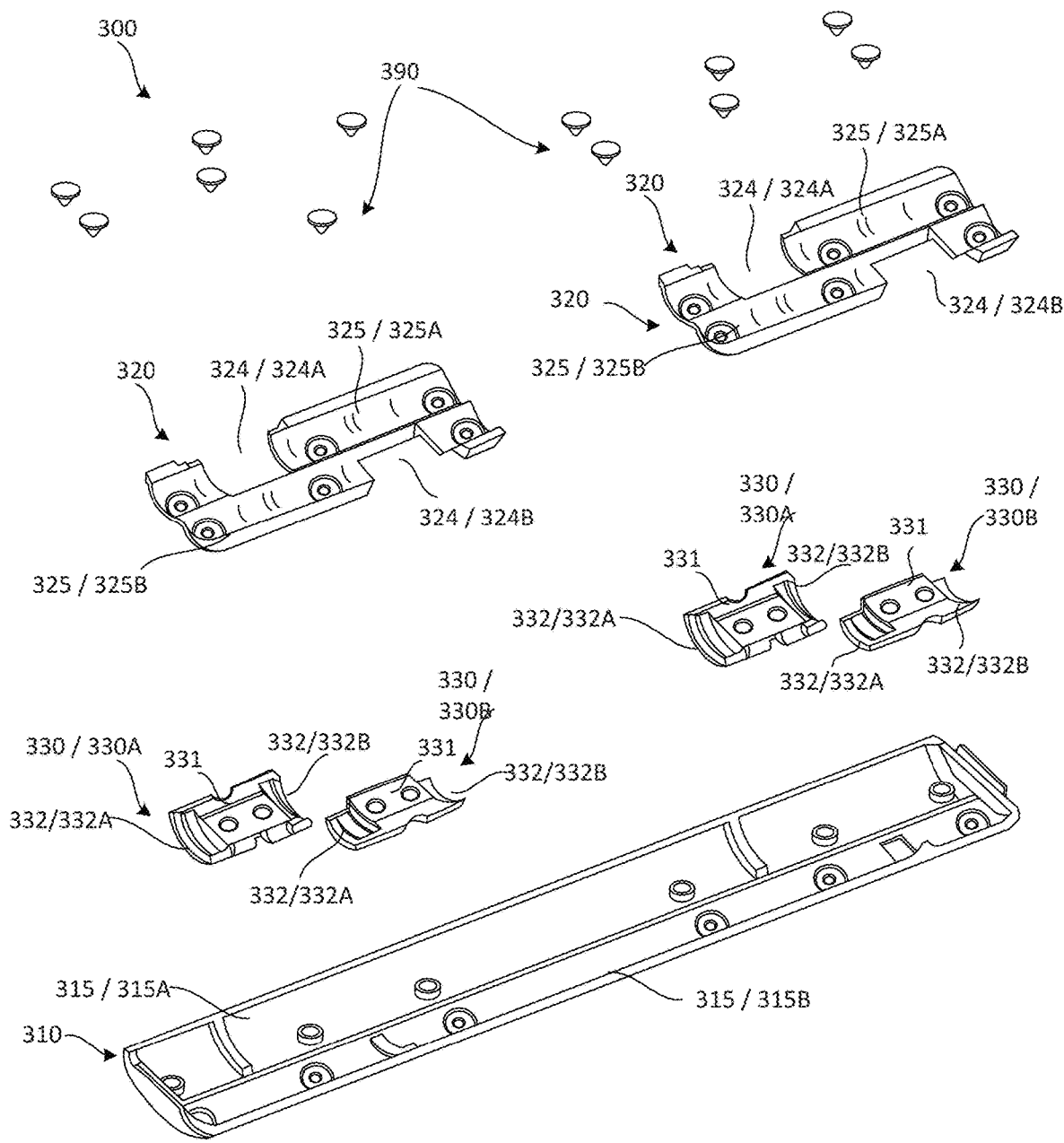
FIG. 5A is an exploded perspective view of an exemplary hinge mechanism 300, in accordance with implementations described herein.
Figure 5B:
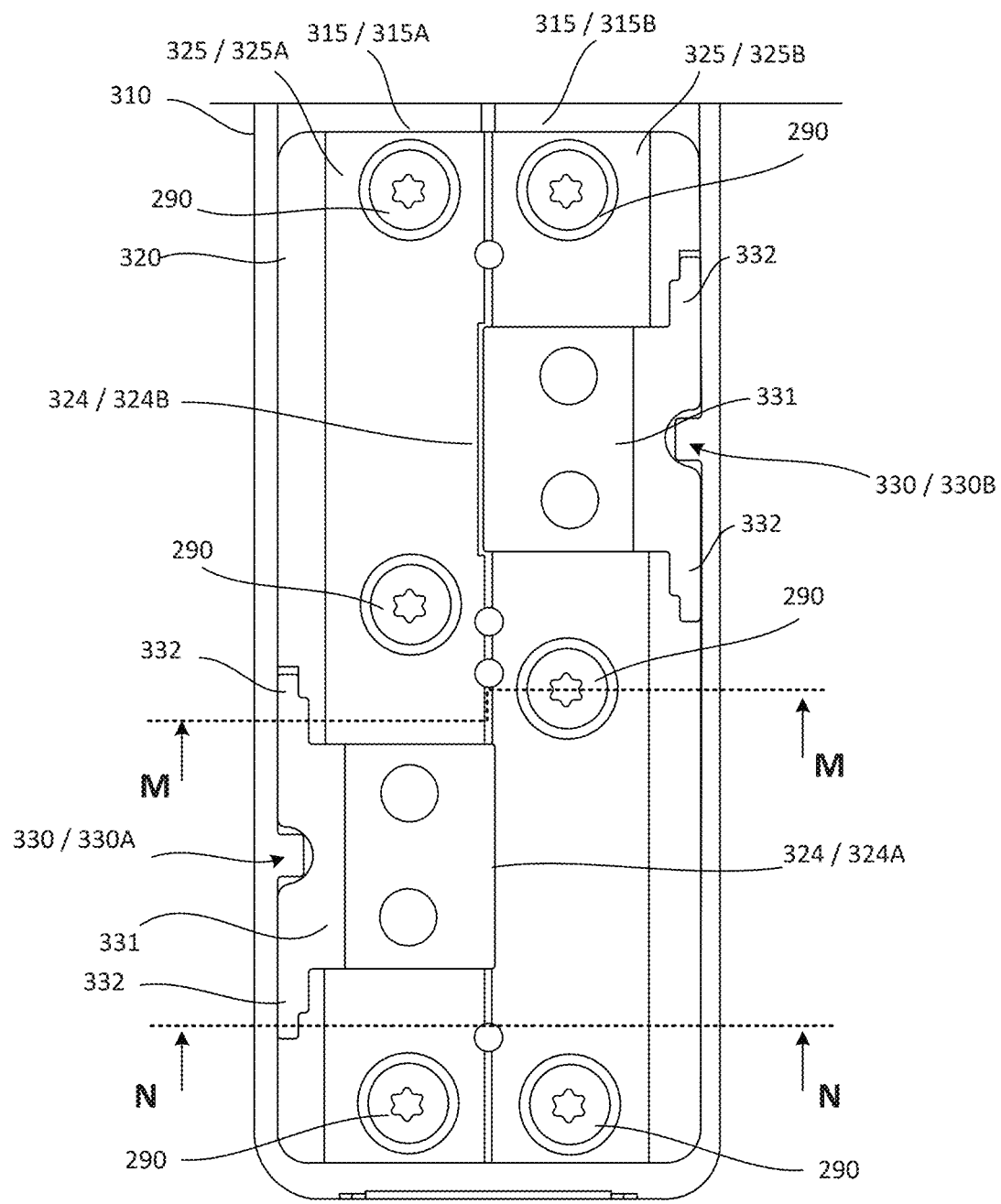
FIG. 5B is an assembled top view of a portion of the exemplary hinge mechanism 300 shown in FIG. 5A, in accordance with implementations described herein.
Figure 5C:
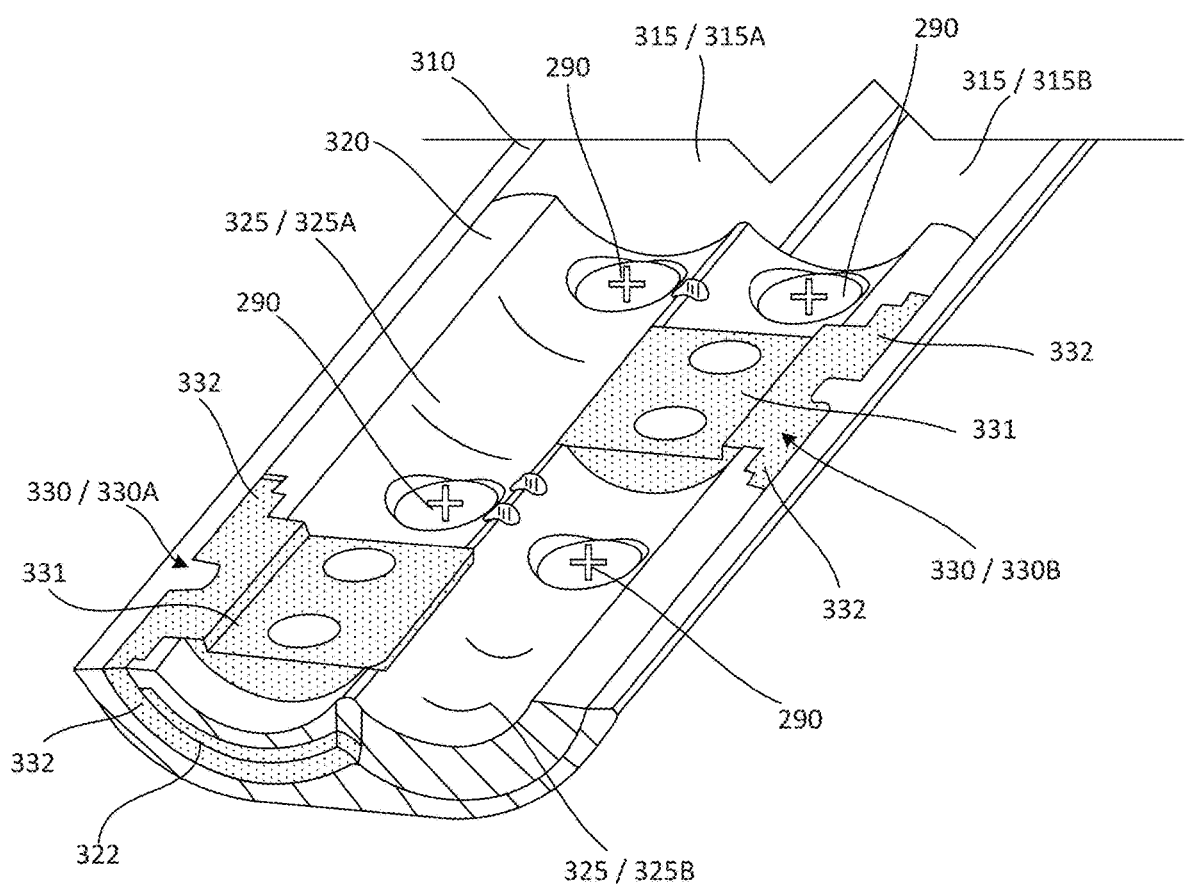
FIG. 5C is a perspective, cross-sectional view of the exemplary hinge mechanism 300, taken along line M-M of FIG. 5B, in accordance with implementations described herein.
Figure 5D:
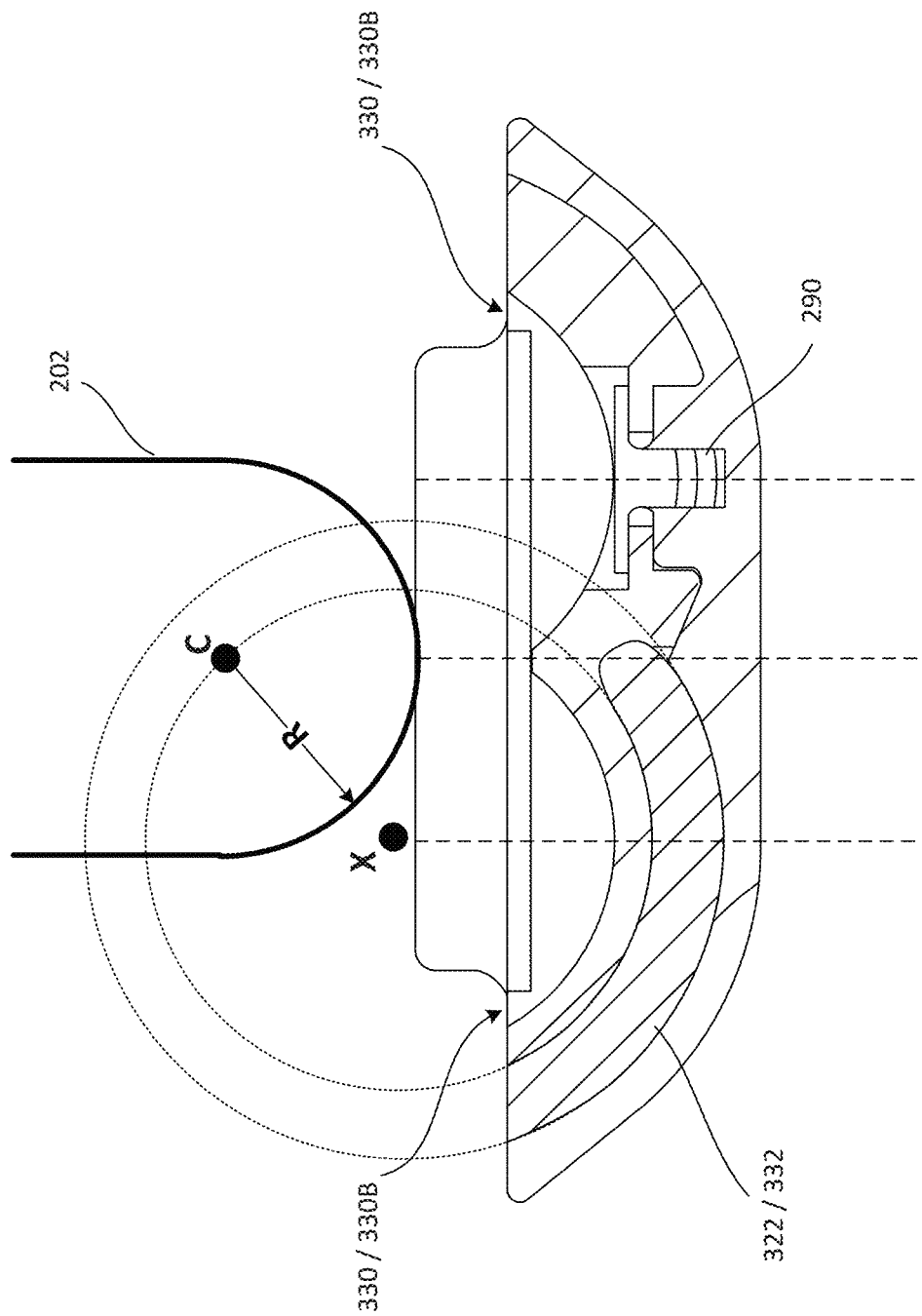
FIG. 5D is a side cross-sectional view of the exemplary hinge mechanism 300, taken along line M-M of FIG. 5C.
Figure 9C:
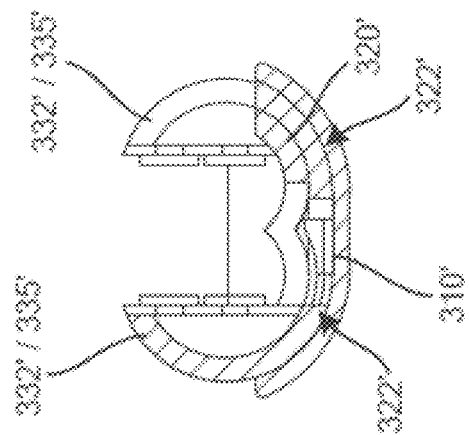
FIGS. 9A-9C are cross-sectional views of the exemplary hinge mechanism shown in FIGS. 8A-8C, respectively.
Figure 9B:
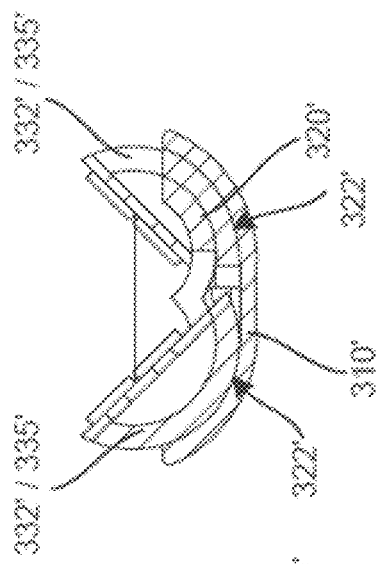
Figure 9A:
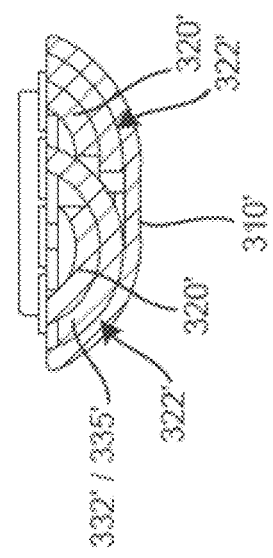

FIG. 5A is an exploded perspective view of an exemplary hinge mechanism 300, in accordance with implementations described herein. FIG. 5B is an assembled top view, of a portion of the exemplary hinge mechanism 300 shown in FIG. 5A. FIG. 5C is a perspective, cross-sectional view taken along line M-M of FIG. 5B. FIG. 5D is a side, cross-sectional view taken along line M-M of FIG. 5B.

As shown in FIGS. 5A-5D, the exemplary hinge mechanism 300 may include a hinge base 310, and at least one hinge cover 320 coupled to the hinge base 310. In the example illustrated in FIG. 5A, two hinge covers 320 are coupled to the hinge base 310, simply for ease of discussion and illustration. In some implementations, the hinge mechanism 300 may include more, or fewer, hinge covers 320 coupled to the hinge base 310. In some implementations, a plurality of fasteners 390 may couple the at least one hinge cover 320 to the hinge base 310. In some implementations, the fasteners 390 may be threaded fasteners, such as, for example, screws. In some implementations, the hinge cover 320 may be coupled to the hinge base 310 using other fastening methods. A plurality of rotation pivots 330 may be movably coupled to the hinge base 310 and the hinge cover 320. Each rotation pivot 330 may rotate about a respective center of rotation X for that rotation pivot 330, that is outside of the center of rotation C of the foldable display 202 (i.e., for a foldable display having a center of rotation C and a bending radius R as in, for example, FIG. 5D). The respective center of rotation X for each of the rotation pivots 330 may be determined as described above with respect to FIGS. 3A through 4B.

The hinge base 310 may extend longitudinally, for a length that corresponds to a length of the bendable section of the foldable display 202. The hinge base 310 may include a first portion defined by first channel 315A, or a first recess 315A, and a second portion defined by a second channel 315B, or a second recess 315B, arranged adjacent to each other, and each extending longitudinally in the hinge base 310. Similarly, in some implementations, each of the hinge covers 320 may include a first portion defined by a first channel 325A, or a first recess 325A, and a second portion defined by a second recess 325B, having a shape, or a contour, corresponding to that of a mating portion of the hinge base 310 to which the hinge cover 320 is coupled. Openings 324 may be formed in the hinge cover 320 to accommodate the rotational movement of the rotation pivots 330 relative to the hinge base 310 and the hinge cover 320. For example, each hinge cover 320 may include a first opening 324A formed in the first recess 325A to accommodate a first rotation pivot 330A, and a second opening 324B formed in the second recess 324B to accommodate a second rotation pivot 330B.

In a computing device such as the exemplary computing device 200 shown in FIGS. 2A and 2B, including the exemplary hinge mechanism 300, the first housing 240A of the computing device 200 may be attached to the rotation pivots 330 aligned along the first recesses 315A/325A and rotatable within the first openings 324A. Similarly, the second housing 240B of the computing device 200 may be attached to the rotation pivots 330 aligned along the second recesses 315B/325B and rotatable within the second openings 324B. In this arrangement (shown in FIG. 7), rotation of the first housing 240A of the computing device 200 may be supported by the portion of the hinge mechanism 300 defined by the first recess 315A of the hinge base 310, the first recess 325A of the hinge cover 320, and the first rotation pivot 330A. Similarly, rotation of the second housing 240B of the computing device 200 may be supported by the portion of the hinge mechanism 300 defined by the second recess 315B of the hinge base 310, the second recess 325B of the hinge cover 320, and the second rotation pivot 330B.

The rotation pivots 330 may be received in the openings 324 formed in the hinge cover 320, in a space defined by the hinge cover 320 and the hinge base 310. In some implementations, a shape, or contour, of each of the rotation pivots 330, for example, that of the body 331 of the rotation pivot 330, may correspond to the shape, or the contour, of the respective recess 315/325 defining the space in which it is received, to facilitate the rotational movement of the rotation pivots 330 relative to the hinge base 310 and the hinge cover 320.

Each rotation pivot 330 may include flanges 332 that extend outward from a body 331 of the rotation pivot 330. In some implementations, a first flange 332A may extend outward from a first lateral side portion of the body 331, and a second flange 332B may extend outward from a second lateral side portion of the body 331, opposite the first lateral side portion thereof. Each flange 332 may be slidably received in a corresponding track 322. In some implementations, the tracks 322 may be formed at a corresponding position in the hinge cover 320. In some implementations, the tracks 322 may be defined by the hinge cover 320 together with the hinge base 310. That is, in some implementations, the tracks 322 may be defined by a surface of the hinge cover 320 on a first side of the track 322, and by a surface of the hinge base 310 on a second side of the track 322. In some implementations, a shape, for example, a contour, of the flange 332 may correspond to a shape, for example, a contour, of the corresponding track 322 in which the flange 332 is received. The shape, or contour, of the track 322, may guide the rotational movement of the rotation pivot 330 relative to the hinge cover 320 and the hinge base 310 (the hinge cover 320 and the hinge base 310 being fixed to each other by the fasteners 390).

FIGS. 6A(1) through 6C(2) are cross-sectional views of the exemplary hinge mechanism 300, taken along line N-N of FIG. 5B. In particular, FIG. 6A provides a side cross-sectional view and a perspective cross-sectional view of the exemplary hinge mechanism 300 in an unfolded configuration of the computing device 200/foldable display 202. FIG. 6C provides a side cross-sectional view and a perspective cross-sectional view of the exemplary hinge mechanism 300 in a folded configuration of the computing device 200/foldable display 202. FIG. 6B provides a side cross-sectional view and a perspective cross-sectional view of the exemplary hinge mechanism 300 in an intermediate configuration, between the unfolded configuration shown in FIG. 6A, and the folded configuration shown in FIG. 6C.

As shown in FIG. 6A, in the unfolded configuration of the computing device 200/hinge mechanism 300, the rotation pivots 330 are substantially fully received in the openings 324 formed in the hinge cover 320, and within the space defined by the hinge cover 320 and the hinge base 310, such that the rotation pivots 330 are in a substantially flat orientation. In the unfolded configuration, the flanges 332 of the rotation pivots 330 are substantially fully received in, or retracted into, the respective tracks 322. In some implementations, a first stopping mechanism may be provided at an interior end of the track 322. In some implementations, the first stopping mechanism may be formed by the closed end portion 327 of the track 322, which restricts further movement of the flange 332 as the flange 332 moves in a direction proceeding into the track 322, and abuts the closed end portion 327 of the track 322. The first stopping mechanism may restrict further motion of the flange 332 in the track 322 to prevent folding of the computing device 200 and the foldable display 202 in excess of a maximum bending radius of the foldable display 202, for example, greater than approximately 180 degrees.

Rotation of the first housing 240A of the computing device 200, attached to the rotation pivots 330 aligned along the first recesses 315A/325A, and/or rotation of the second housing 240B of the computing device 200, attached to the rotation pivots 330 aligned along the second recesses 315B/325B, as illustrated by the intermediate position shown in FIG. 6B, may cause the computing device 200/hinge mechanism 300 to transition from the unfolded configuration shown in FIG. 6A to the folded configuration shown in FIG. 6C.

As shown in FIG. 6C, in the folded configuration of the computing device 200/hinge mechanism 300, the rotation pivots 330 have substantially fully rotated out of the openings 324 formed in the hinge cover 320, and outside of the space defined by the hinge cover 320 and the hinge base 310, such that the rotation pivots 330 are in a substantially upright orientation. In the folded configuration, the flanges 332 of the rotation pivots 330 are substantially fully extended from, or out of, the respective tracks 322. In some implementations, a second stopping mechanism may be provided at an outlet end of the track 322. In some implementations, the second stopping mechanism may include a track protrusion 323 formed at an outlet end portion of the track 322 which engages a pivot protrusion 333 formed at an end portion of the flange 332 of the rotation pivot 330. As the rotation pivot 330 rotates relative to the hinge cover 320/hinge base 310 and the flange 332 moves in the track 322, engagement of the track protrusion 323 and the pivot protrusion 333 may retain the end of the flange 332 within the track 322, and thus retain the rotation pivot 330 in a coupled state relative to the hinge cover 320/hinge base 310. In some implementations, the second stopping mechanism (including the track protrusion 323 and the pivot protrusion 333) may prevent folding of the computing device 200 and the foldable display 202 to a radius that is less than the minimum bending radius R of the foldable display 202.

Figure 10B:
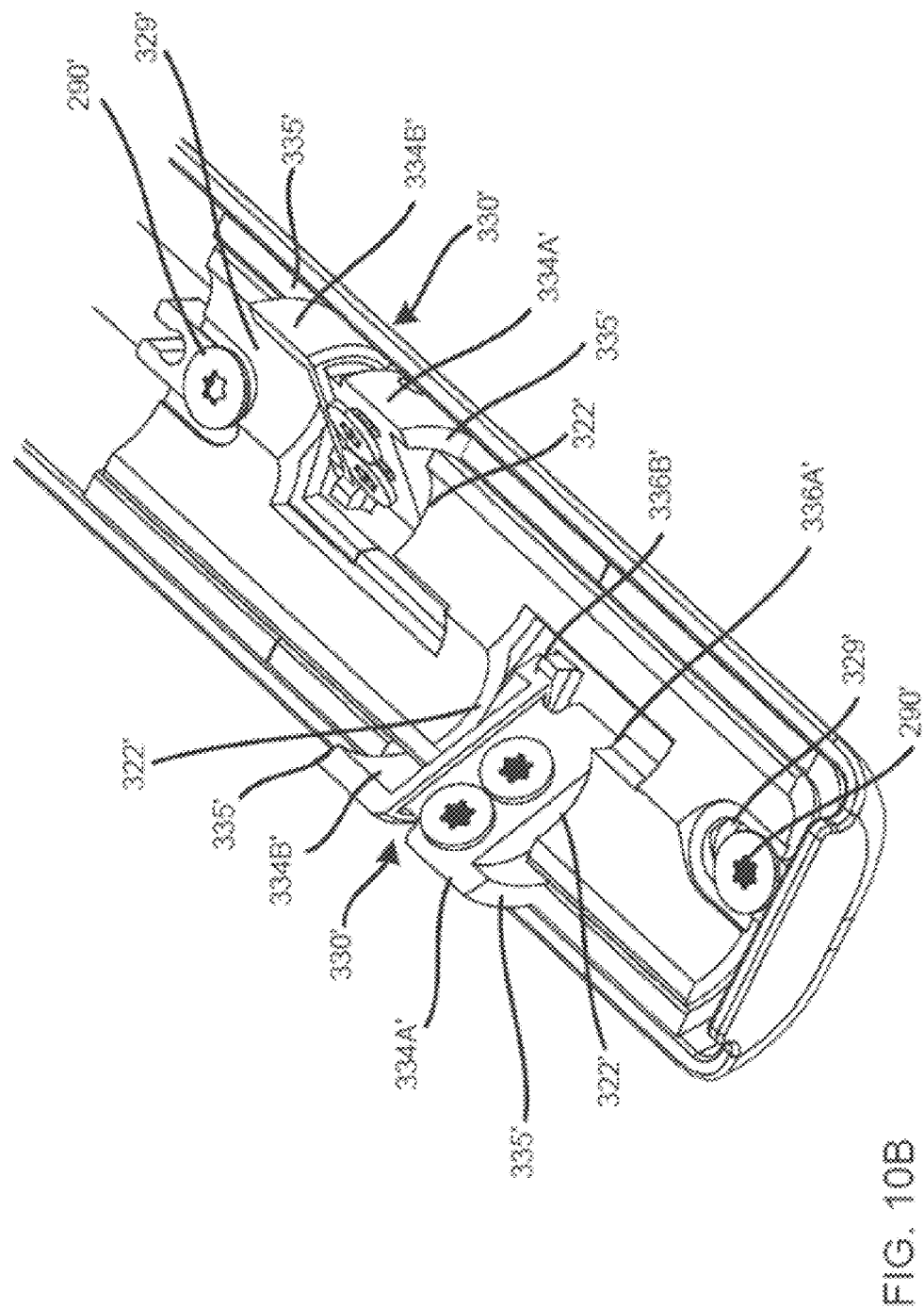
Figure 10C:
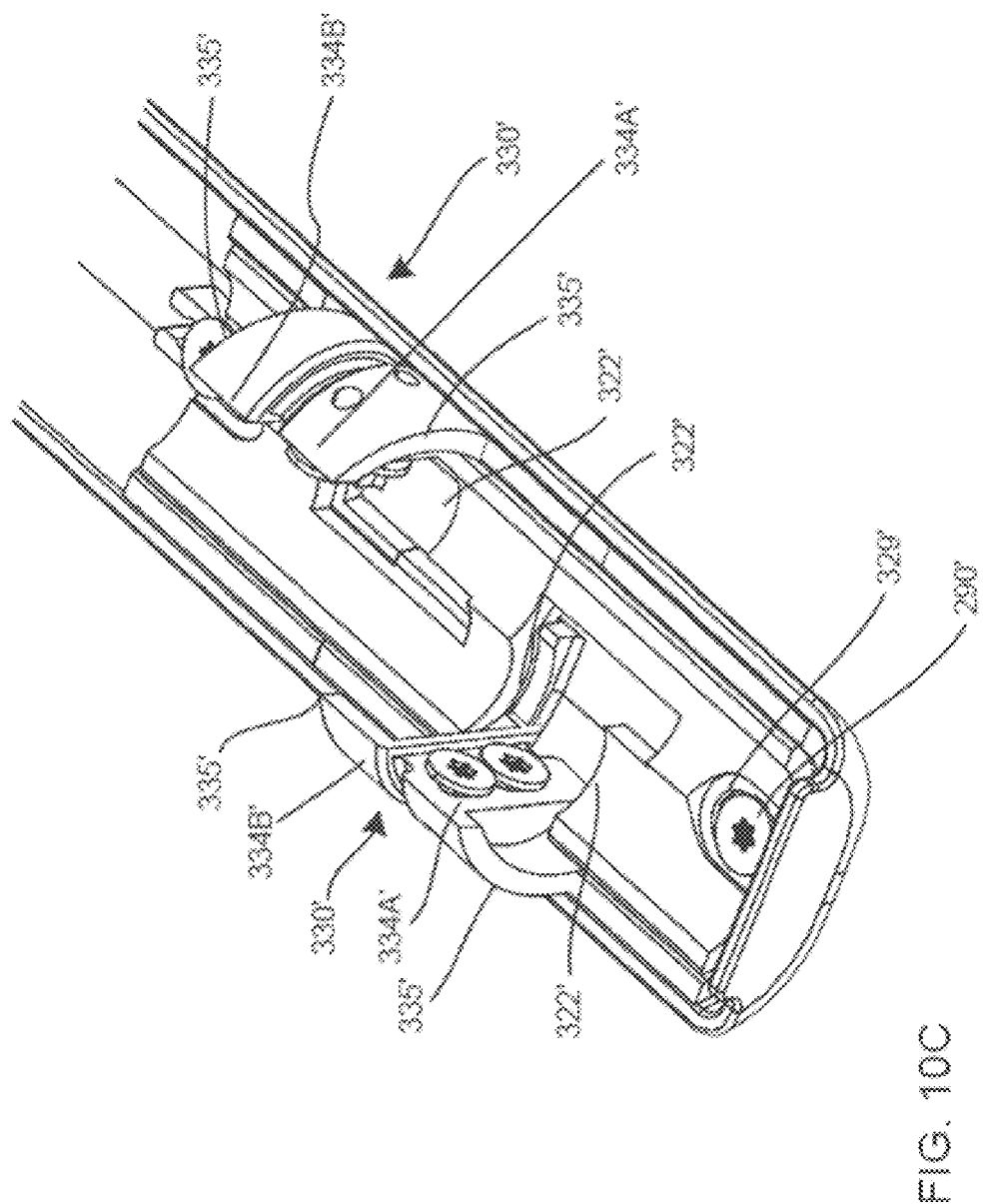

FIG. 7 is a perspective view of an exemplary pair of rotation pivots 330' (330A', 330B') of an exemplary hinge mechanism 300' shown in FIGS. 8A through 10C, in accordance with implementations described herein. FIGS. 8A-8C are top views of the exemplary hinge mechanism 300' in an unfolded configuration, an interim configuration, and a folded configuration, respectively. FIGS. 9A-9C are cross-sectional views of the exemplary hinge mechanism 300' in the unfolded configuration, the interim configuration, and the folded configuration, respectively. FIGS. 10A-10C are perspective views of the exemplary hinge mechanism 300' in the unfolded configuration, the interim configuration, and the folded configuration, respectively.

As shown in FIG. 7, the first rotation pivot 330A' may include a body 331', with a first flange 332A' at a first side of the body 331', and a second flange 332B' at a second side of the body 331'. The first flange 332A' may include an inclined surface 335A' at an outer edge portion thereof, such that a first end portion 334A' of the first flange 332A' is more narrow than a second end portion 336A' of the first flange 332A'. The second flange 332B' may include an inclined surface 335B' at an outer edge portion thereof, such that the second end portion 336B' of the second flange 332B' is more narrow than the first end portion 334B' of the second flange 332B'. As described above, the second rotation pivot 330B' of the pair of rotation pivots 330' may be the mirror image of the first rotation pivot 330A' of the pair of rotation pivots 330', and the first and second rotation pivots 330A, 330B may be mounted in opposite orientations in the hinge mechanism 300'.

The exemplary hinge mechanism 300', in accordance with implementations described herein, may include a hinge cover 320' coupled to a hinge base 310'. The pair of rotation pivots 330' may be received in a space formed between the hinge base 310' and the hinge cover 320', and may selectively extend out, through openings 324' formed in the hinge cover 320' as the hinge mechanism 300' is rotated between an open position and a closed position, and the inclined surfaces 335' of the rotation pivots 330' interact with respective tracks 322' defined by the hinge base 310' and the hinge cover 320. In some implementations, the inclined surface 335A of the first flange 332A may be substantially parallel to the inclined surface 335B of the second flange 332B. In some implementations, the tracks 322' (in which the flanges 332' are received) may be arranged in parallel to each other, but not in parallel to the inclined surfaces 335' of the respective flanges 332' received therein. Interaction between the inclined surfaces 335' of the flanges 332' of the rotation pivots 330' and the tracks 322' may also cause a sliding motion of the hinge cover 320' relative to the base 310', to accommodate the stroke distance D as described above.

As shown in FIG. 8A, in the unfolded configuration of the hinge mechanism 300', the pair of rotation pivots 330' are substantially fully received in the openings 324' formed in the hinge cover 320', and within the space defined by the hinge cover 320' and the hinge base 310', such that the rotation pivots 330' are in a substantially flat orientation. In the unfolded configuration shown in FIG. 8A, the flanges 332' of the rotation pivots 330' are substantially fully received in, or retracted into, the respective tracks 322'. In the unfolded configuration of the hinge mechanism 300' shown in FIG. 8A, the hinge cover 320' is in a first longitudinal position relative to the hinge base 310'.

Rotation of, for example, the first housing 240A of the computing device 200 described above, attached to the rotation pivot(s) 330A', and/or rotation of the second housing 240B of the computing device 200 described above, attached to the rotation pivots 330B', as illustrated by the intermediate position shown in FIG. 8B, may cause the computing device 200/hinge mechanism 300' to transition from the unfolded configuration shown in FIG. 8A to the folded configuration shown in FIG. 8C.

As shown in FIG. 8C, in the folded configuration, the rotation pivots 330' have substantially fully rotated out of the openings 324' formed in the hinge cover 320', and outside of the space defined by the hinge cover 320' and the hinge base 310', such that the rotation pivots 330' are in a substantially upright orientation. In the folded configuration, the flanges 332' of the rotation pivots 330' are substantially fully extended from, or out of, the respective tracks 322'.

In the folded configuration of the hinge mechanism 300' shown in FIG. 8C, movement of the rotation pivots 330' out of the openings 324, and interaction between the flanges 332' and the tracks 322' has caused the hinge cover 320' to slide relative to the hinge base 310', from the first position shown in FIG. 8A, through the interim position shown in FIG. 8B, to a second position shown in FIG. 8C. In some implementations, the inclination of the inclined surfaces 335' of the flanges 332', together with the orientation of the corresponding tracks 322', may cause the hinge cover 320 ' to slide by a distance D, corresponding to the stroke distance D discussed above. In some implementations, the hinge cover 320' may be slidably coupled to the hinge base 310' by, for example, a fastener 390' received in an elongated slot 329' formed in the hinge cover 320'. Sliding motion of the hinge cover 320' in this manner, in coordination with the pivoting, or rotation, of the rotation pivots 330', may wholly or substantially fully accommodate, or absorb, the stroke distance D between the unfolded and folded configurations.

In particular, the increasing or decreasing thickness of the flange 332' (depending on the direction of rotation of the rotation pivot 330') and the interaction of the inclined surface 335' of the flange 332' with the interior surface of the track 322' may cause the sliding motion of the hinge cover 320' and the rotation pivots 330', in coordination with the rotation of the rotation pivots 330', to accommodate the stroke distance D. That is, as the rotation pivots 330' pivot about the pivot axis in the manner described, and the inclined surfaces 335' of the flanges 332' interact with the respective tracks 322', the hinge cover 320' is forced to slide in a direction parallel to the pivot axis, to accommodate the inclined surfaces 335'/increasing/decreasing thickness of the flanges 332'. The geometry of the tracks 322' (defined by the internal geometry of the hinge cover 320' and the hinge base 310' in this example) juxtaposed with the inclined surfaces 335' (i.e., defining angled, outer lateral sidewalls of the rotation pivots 330') dictates substantially equal amounts of rotation for each rotation pivot 330' of the hinge mechanism 300', thus dictating synchronized rotation of the pair of rotation pivots 330'. The sliding motion of the hinge cover 320' provided in response to the interaction of the inclined surfaces 335' of the flanges 332' and the fixed geometry of the tracks 322' in turn provides for the coordinated rotation of the first and second housings of the computing device and the flexible display coupled thereto, while also accommodating the stroke distance D as described above.

Figure 11:
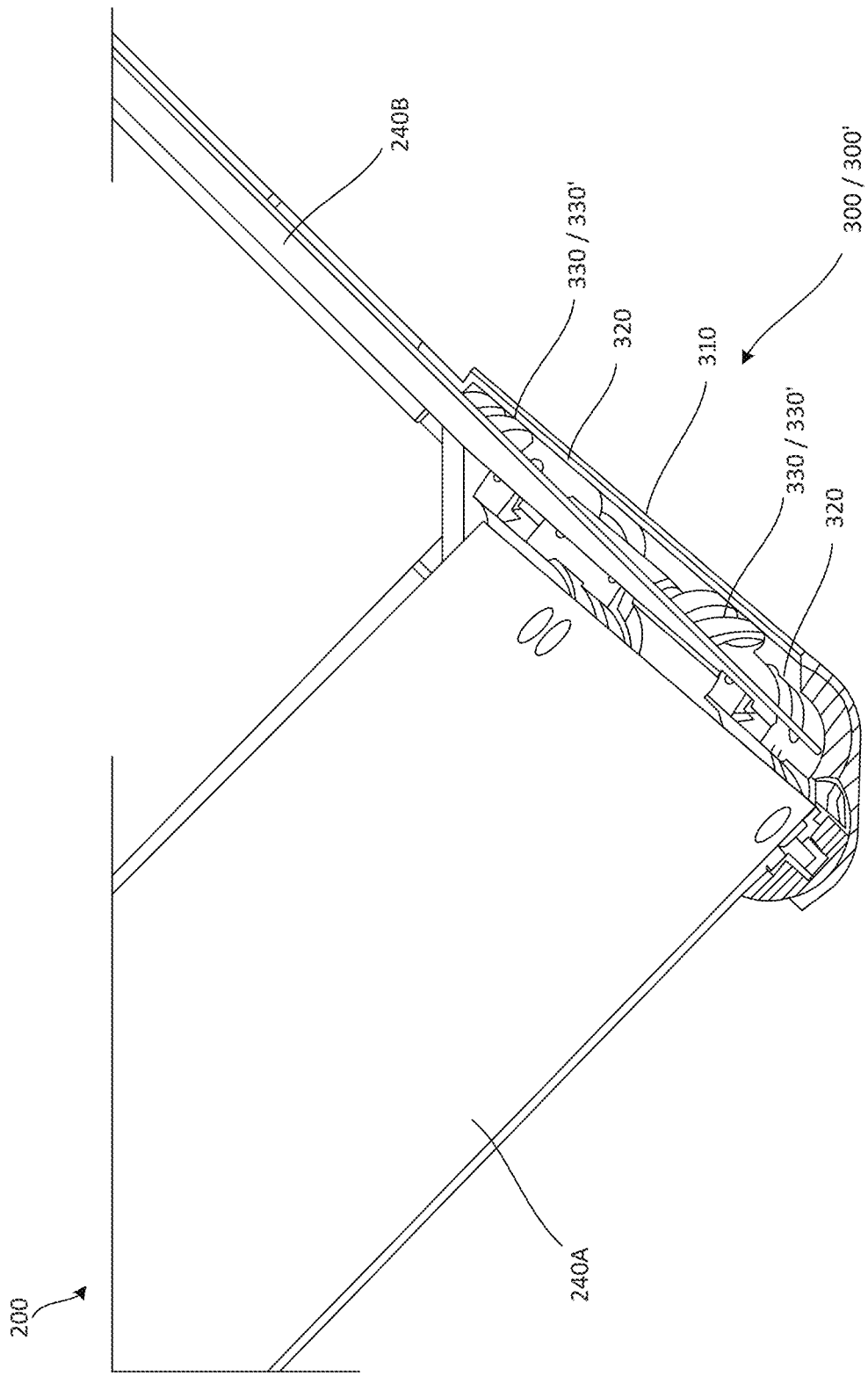
FIG. 11 is a perspective view of a housing of a computing device coupled to a hinge mechanism, in accordance with implementations described herein.

As noted above, the hinge mechanism 300/300' may be assembled as described above and coupled to the housing 240 of a computing device such as the exemplary computing device 200 shown in FIGS. 2A-2B. For example, as shown in FIG. 11, the first housing 240A of the computing device 200 may be attached to the rotation pivots 330/330' aligned along the first recesses 315A/325A and rotatable within the first openings 324A and the second housing 240B of the computing device 200 may be attached to the rotation pivots 330/330' aligned along the second recesses 315B/325B and rotatable within the second openings 324B. In this arrangement, the hinge mechanism 300/300' may provide for a fluid, relatively natural, torque-free motion between the unfolded and folded configurations, while maintaining the foldable display 202 within allowable bending limits. In some implementations, magnets may be included in the computing device 202 to, for example, maintain the computing device 202 in the unfolded configuration and/or in the unfolded configuration. That is, due to the lack of mechanical torque mechanisms (which would, for example, hold the first and second housings 240A, 240B in interim positions), magnets may provide a mechanism for maintaining the computing device 200 including the foldable display 202 in a desired configuration.

For example, as shown in FIGS. 12A-12C, in some implementations, one or more first magnets 260 may be provided at corresponding positions along an outer edge portion of the first housing 240A and an outer edge portion of the second housing 240B of the computing device 200. In the folded configuration shown in FIG. 9C, the first magnets 260 may be aligned, and exert an attractive force that draws and holds the first and second housings 240A, 240B together in the folded configuration. In some implementations, one or more second magnets 270 may be provided at corresponding positions along an inner edge portion of the first housing 240A and an inner edge of the second housing 240B of the computing device 200. In the unfolded configuration shown in FIG. 9B, the second magnets 270 may be aligned, and exert an attractive force that draws and holds the first and second housings 240A, 240B together in the unfolded configuration.

In a computing device including a hinge mechanism, in accordance with implementations as described herein, a relatively simple, and relatively reliable hinge mechanism may support the folding and unfolding of a foldable display, with a relatively natural motion, while also providing for planarity of the foldable display in the unfolded configuration, particularly in the bendable section of the foldable display. The hinge mechanism may accomplish this without the use of complicated gearing which add cost and complexity, which produce a relatively unnatural, restrictive folding and unfolding motion, and which may detract from the utility and reliability of the computing device. This relatively simple and reliable hinge mechanism may guide and support the folding and unfolding of the computing device including the foldable display, while still providing support to the foldable display, and while still maintaining the foldable display within allowable bending radius limits.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It is understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It is understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A hinge mechanism, comprising:
    a hinge base including a first portion and a second portion, the first portion and the second portion extending longitudinally along a length of the hinge base;
    at least one hinge cover immovably coupled to the hinge base, the at least one hinge cover including:
        a first portion coupled to the first portion of the hinge base;
        a second portion coupled to the second portion of the hinge base; and
        a plurality of openings, the plurality of openings including:
            a first opening formed in the first portion of the hinge cover; and
            a second opening formed in the second portion of the hinge cover; and
    a plurality of rotation pivots rotatably positioned in the plurality of openings in the hinge cover, in a space defined by the hinge base and the hinge cover, the plurality of rotation pivots including:
    a first rotation pivot positioned at the first opening in the first portion of the hinge cover, and rotatably coupled between the first portion of the hinge base and the first portion of the hinge cover; and
    a second rotation pivot positioned at the second opening in the second portion of the hinge cover, and rotatably coupled between the second portion of the hinge base and the second portion of the hinge cover, wherein each rotation pivot, of the plurality of rotation pivots, includes:
    a body portion;
    a first flange defined along a first lateral side of the body portion;
    a second flange defined along a second lateral side of the body portion, opposite the first lateral side thereof, wherein a thickness of the body portion is greater than thicknesses of the first flange and the second flange, wherein each opening, of the plurality of openings in the hinge cover, includes:
        a first track defined along a first peripheral edge portion of the opening, wherein the first track is configured to slidably receive the first flange of a corresponding rotation pivot received therein; and
        a second track defined along a second peripheral edge portion of the opening, opposite the first peripheral edge portion thereof, wherein the second track is configured to slidably receive the second flange of a corresponding rotation pivot received therein;
    a first stopping mechanism that restricts at least one of movement of the first flange within the first track or movement of the second flange within the second track, in an unfolded configuration; and
    a second stopping mechanism that is rotationally locked to the second flange and restricts at least one of, movement of the first flange within the first track or movement of the second flange within the second track, in a folded configuration.

2. The hinge mechanism of claim 1, wherein the hinge mechanism is configured to be coupled in a computing device that includes a foldable display, at a portion of the computing device corresponding to a bendable section of the foldable display, wherein each first rotation pivot is configured to be coupled to a first housing of the computing device, such that the first housing rotates together with the first rotation pivot relative to the hinge base and the hinge cover; and
    each second rotation pivot is configured to be coupled to a second housing of the computing device, such that the second housing rotates together with the second rotation pivot relative to the hinge base and the hinge cover.

3. The hinge mechanism of claim 2, wherein the hinge mechanism is configured to rotate the first housing and the second housing between the unfolded configuration of the computing device and the folded configuration of the computing device.

4. The hinge mechanism of claim 1, wherein, in an unfolded configuration of the hinge mechanism,
    the first rotation pivot is in a retracted position, in which the first rotation pivot is received in the space defined by the first portion of the hinge base and the first portion of the hinge cover defining the first opening; and
    the second rotation pivot is in a retracted position, in which the second rotation pivot is received in the space defined by the second portion of the hinge base and the second portion of the hinge cover defining the second opening.

5. The hinge mechanism of claim 1, wherein, in a folded configuration of the hinge mechanism,
    the first rotation pivot is in an extended position, in which the first rotation pivot is rotated through the first opening formed in the first portion of the hinge cover and out of the space defined by the first portion of the hinge base and the first portion of the hinge cover defining the first opening; and
    the second rotation pivot is in an extended position, in which the second rotation pivot is rotated through the second opening in the second portion of the hinge cover, and out of the space defined by the second portion of the hinge base and the second portion of the hinge cover defining the second opening.

6. The hinge mechanism of claim 1, further comprising an inclined surface along an outer peripheral edge portion of at least one of the first flange or the second flange, such that a width of the at least one the first flange or the second flange at a first end portion thereof is greater than a width of the at least one of the first flange or the second flange at a second end portion thereof.

7. The hinge mechanism of claim 6, wherein the at least one of the first flange or the second flange is slidably received in a track defined along an edge portion of the opening in which the corresponding rotation pivot is received, and wherein the track guides a sliding movement of the at least one of the first flange or the second flange as the rotation pivot rotates.

8. The hinge mechanism of claim 1, wherein an outer peripheral contour of the first flange corresponds to an inner peripheral contour of the first track, and an outer peripheral contour of the second flange corresponds to an inner peripheral contour of the second track, and
wherein the first track guides a sliding movement of the first flange and the second track guides a sliding movement of the second flange as the rotation pivot rotates from a first position, in which the hinge mechanism is in the unfolded configuration, and a second position, in which the hinge mechanism is in the folded configuration.

9. The hinge mechanism of claim 8, wherein
in the unfolded configuration, the rotation pivot is in a retracted position in which the rotation pivot is received in the corresponding space between the hinge base and the hinge cover, and
in the folded configuration, the rotation pivot is in an extended position in which the rotation pivot is rotated through the corresponding opening and out of the space defined by the hinge base and the hinge cover.

10. The hinge mechanism of claim 1, wherein
the first stopping mechanism includes at least one of
a closed terminal end of the first track that restricts further sliding movement of the first flange in an unfolding direction, or
a closed terminal end of the second track that restricts further sliding movement of the second flange in an unfolding direction,
so as to restrict rotation of the hinge mechanism beyond a maximum bending radius, and
the second stopping mechanism further includes at least one of
a track protrusion formed at an open end portion of the first track that engages a pivot protrusion formed at a terminal end portion of the first flange to restrict further sliding movement of the first flange in a folding direction, or
a track protrusion formed at an open end portion of the second track that engages a pivot protrusion formed at a terminal end portion of the second flange to restrict further sliding movement of the second flange in a folding direction,
so as to restrict rotation of the hinge mechanism beyond a minimum bending radius.

11. The hinge mechanism of claim 1, wherein the at least one hinge cover is screwed to the hinge base.

* * * * *